(12) United States Patent
Hori et al.

(10) Patent No.: US 6,318,662 B1
(45) Date of Patent: Nov. 20, 2001

(54) WEBBING WINDING DEVICE

(75) Inventors: Seiji Hori; Keiichi Katoh; Keisuke Imai; Tatsuo Yamashita; Tomonori Nagata, all of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/431,127

(22) Filed: Nov. 1, 1999

(30) Foreign Application Priority Data

Nov. 2, 1998 (JP) ................................................. 10-312393

(51) Int. Cl.$^7$ ................................................. B60R 22/46
(52) U.S. Cl. ................................................. 242/374
(58) Field of Search .......................... 242/374; 280/806; 297/478

(56) References Cited

U.S. PATENT DOCUMENTS

| 5,699,976 | * | 12/1997 | Hori ..................................... 242/374 |
| 5,906,327 | * | 5/1999 | Chamings ........................... 242/374 |

FOREIGN PATENT DOCUMENTS

| 3220498-A1 | * | 12/1983 | (DE) ..................................... 242/374 |
| 2500192 |  | 3/1996 | (JP) . |

* cited by examiner

*Primary Examiner*—John M. Jillions
(74) *Attorney, Agent, or Firm*—Nixon Peabody LLP; Thomas W. Cole

(57) ABSTRACT

A webbing winding device having a pre-tensioner for tensioning a webbing for restraining a passenger in a passenger restraining direction in an emergency deceleration of a vehicle, comprising a winding shaft to which an end of the webbing is fixed and a gear train mechanism comprising a plurality of gears arranged in such a manner that adjacent gears mesh with each other, wherein a driving gear which receives an external driving force when the pre-tensioner is actuated is driven from a starting end position to a terminating end, position which are set in advance, so as to rotate the winding shaft in a direction for retracting the webbing, and when a driving of the driving gear is completed, at least a pair of adjacent gears are separated so as to enable the winding shaft to be rotated in the direction for retracting the webbing by inertial force.

22 Claims, 27 Drawing Sheets

F I G. 3
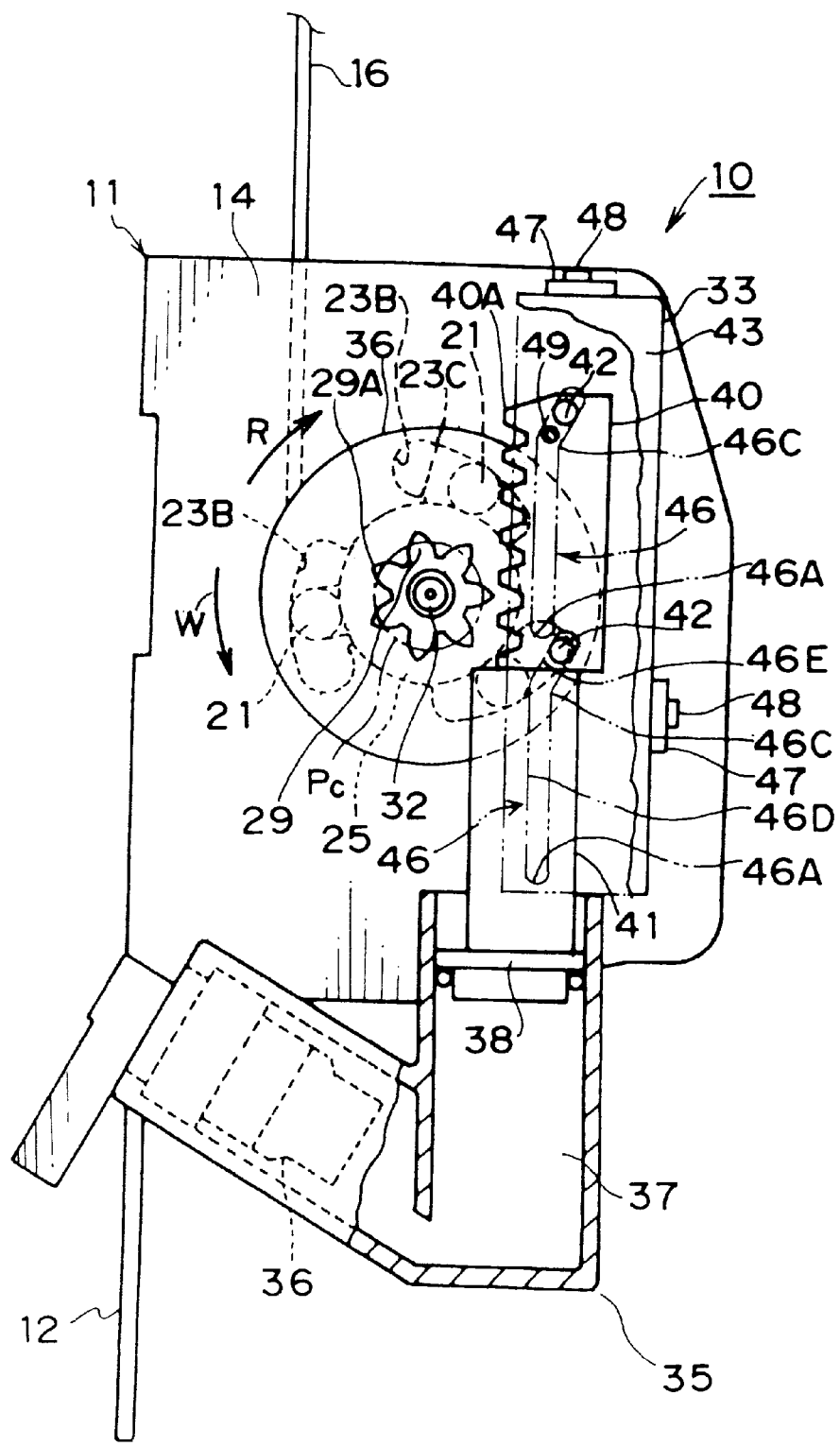

F I G. 6
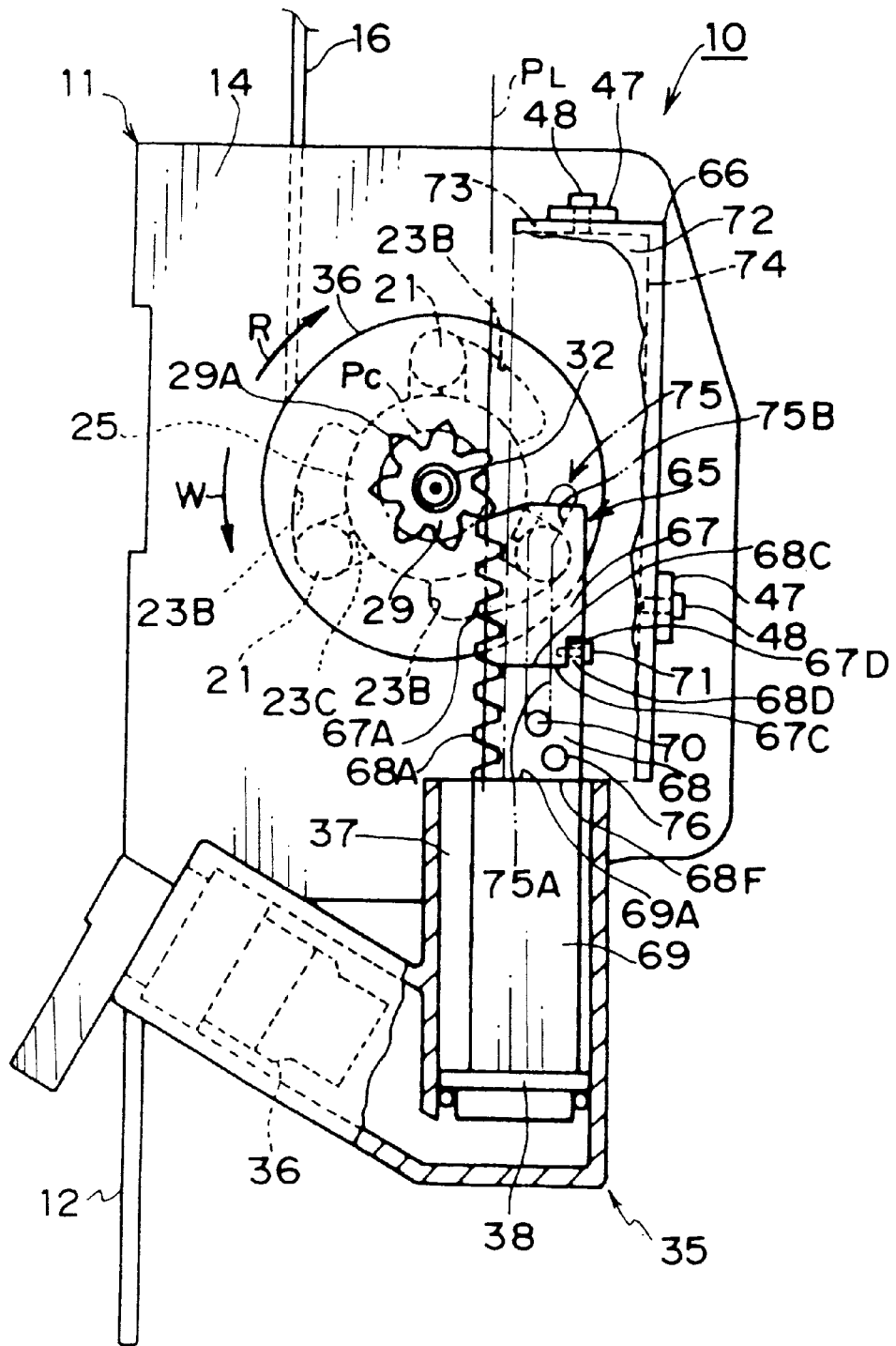

F I G. 1 9
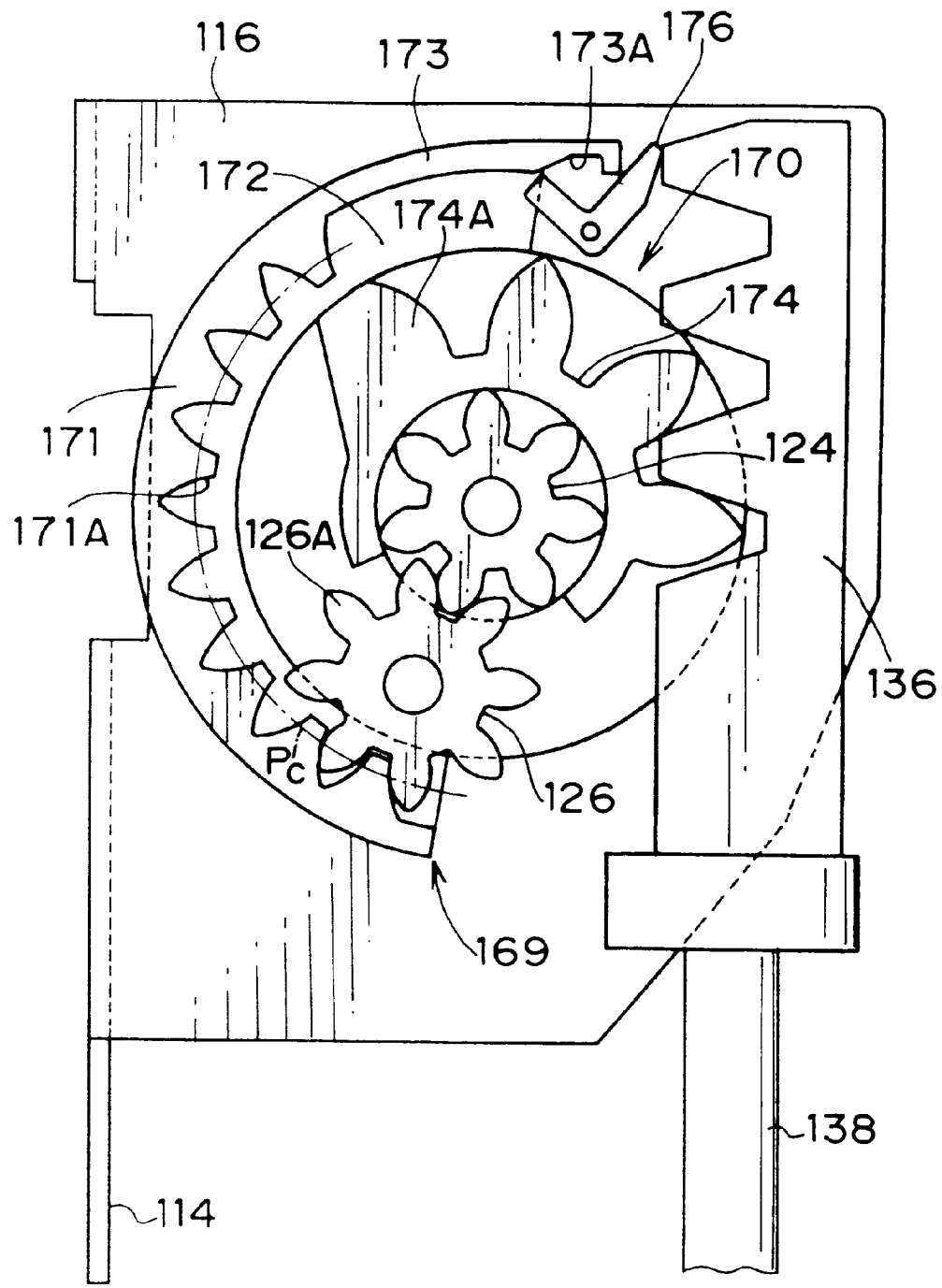

F I G. 2 7
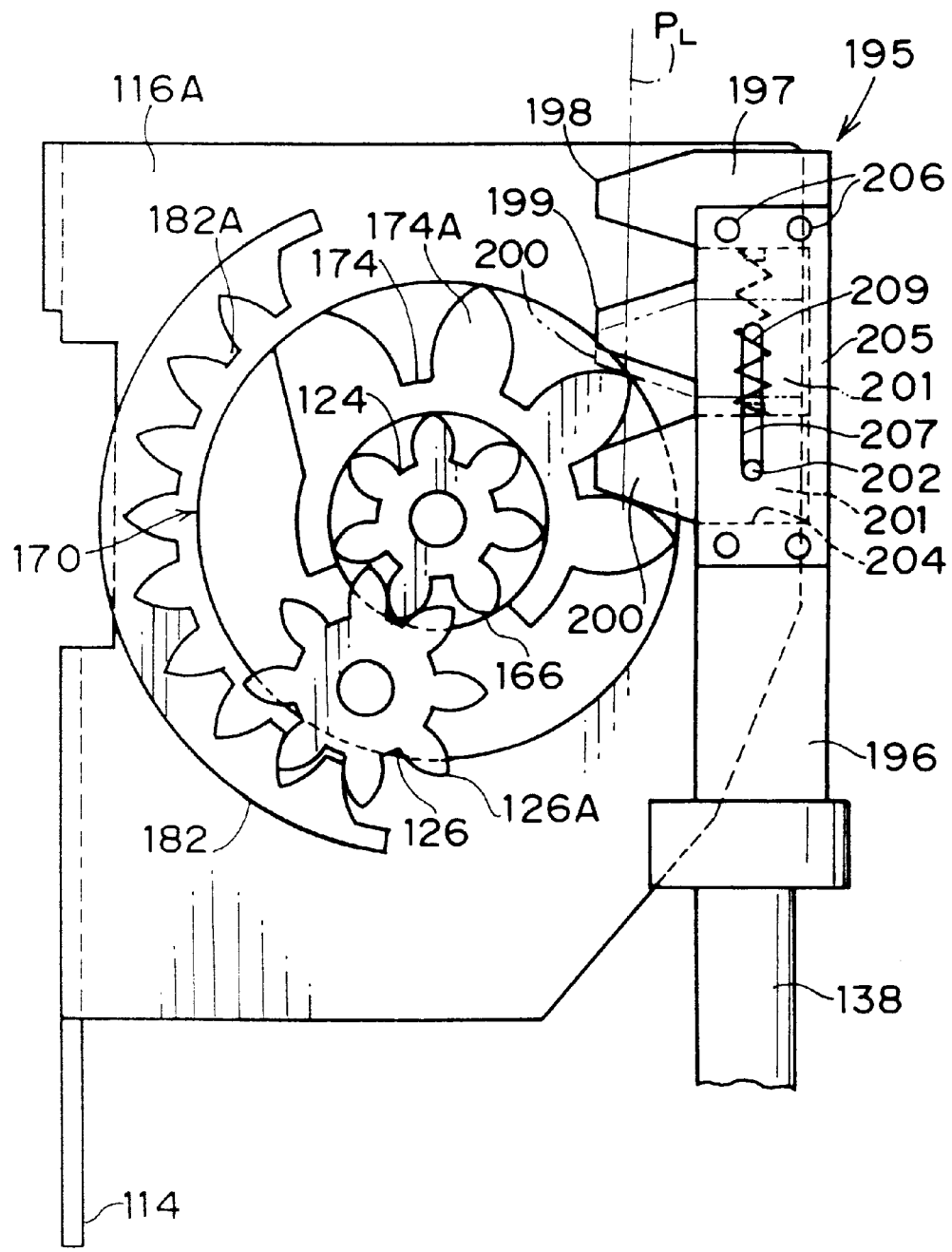

WEBBING WINDING DEVICE

BACKGROUND OF THE INVENTION

1. Field of the Invention

The present invention relates to a webbing winding device having a pre-tensioner which tenses a passenger restraining webbing of a seat belt apparatus in a passenger restraining direction during an emergency deceleration of a vehicle cause by a vehicle collision or the like.

2. Description of the Related Art

Some types of webbing winding device for use in a vehicle seat belt unit have a pre-tensioner for removing play in the webbing by retracting the webbing so that it becomes tense during an emergency deceleration of a vehicle caused by a collision or the like. This type of webbing winding device has been described in, for example, Japanese Patent No. 2500192. The belt retractor which is a webbing winding device described in Japanese Patent No. 2500192 comprises a belt drum around which a belt web (webbing) is wound, a pinion connected to this belt drum via a free wheel connecting apparatus and gear transmitting means for transmitting rotation in one direction only, a rack which meshes with this pinion and a piston driving apparatus in which a piston is connected to this rack. When a vehicle is in a collision, the piston driving apparatus is actuated by gas generated by a gas generator so as to move the rack. The pinion is then rotated in a direction for winding up the belt web and the gear transmitting means increases the angular velocity of the rotation of the pinion and transmits it to the belt drum.

Further, even if the pre-tensioner is not actuated, the above described webbing winding device is continually urging the webbing winding shaft so as to reduce play in the webbing. However, the winding force for the webbing from the winding shaft cannot be made very strong in order to avoid imparting a feeling of strong pressure to a passenger from the webbing. AS a result, sometimes there is a slight play in the webbing and the amount of winding until the webbing becomes tense during an emergency such as a vehicle collision varies depending on the magnitude of this play. Therefore, in a conventional webbing winding device, in order to ensure that the webbing remains tense during an emergency such as a vehicle collision, the play in the webbing is assumed to be substantially at the maximum so that the webbing winding amount, which is the amount the webbing can be wound up by the pre-tensioner, is set as a large amount.

To increase the winding amount of the webbing by the pre-tensioner in the above described webbing winding device, it is necessary to increase the travelling stroke of the rack by the piston driving apparatus or increase the acceleration ratio from the gear transmission means so as to increase the distance rotated by the belt drum with respect to the distance traveled by the rack. However, if the movement stroke of the rack by the piston apparatus is increased, the lengths of the piston driving apparatus and rack are extended so that the size of the apparatus increases. Further, because the stages of the gears constituting the gear transmitting means need to be multiplied in order to increase the acceleration ratio of the gear transmission means, the size of the apparatus is enlarged.

SUMMARY OF THE INVENTION

Accordingly, in view of the above problems, an object of the present invention is to provide a small webbing winding device capable of reliably winding the webbing onto a winding shaft until the webbing becomes tense when the pre-tensioner is actuated, even if play in the webbing is large.

According to a first aspect of the present invention, there is provided a webbing winding device having a pre-tensioner for tensioning a webbing for restraining a passenger in a passenger restraining direction in an emergency deceleration of a vehicle, the webbing winding device comprising: a winding shaft to which an end of the webbing is fixed; and a gear train mechanism comprising a plurality of gears arranged in such a manner that adjacent gears mesh with each other, wherein a driving gear which receives an external driving force when the pre-tensioner is actuated is driven from a starting end position to a terminating position, which are set in advance, so as to rotate the winding shaft in a direction for retracting the webbing, and when a driving of the driving gear is completed, at least a pair of adjacent gears are separated so as to enable the winding shaft to be rotated in the direction for retracting the webbing by inertial force.

In the gear train mechanism of the webbing winding device having the above structure, when the pre-tensioner is actuated, a driving gear is driven from a starting end position set in advance to a terminating end position set in advance so as to rotate the winding shaft in the webbing winding direction. When the driving of the driving gear is completed, at least a pair of adjacent gears are separated so as to enable the winding shaft to rotate in the webbing retracting direction due to an inertial force. As a result, when the pre-tensioner is actuated, the winding shaft is rotated by torque transmitted from the gear train mechanism enabling the webbing to be wound around the winding shaft. When the driving of the driving gear is completed, at least a pair of adjacent gears are separated so that a rotation of the winding shaft in the webbing retracting direction is not blocked. Thus, if there is play in the webbing after the driving of the driving gear is completed, the tension of the webbing to be applied to the winding shaft as a rotation load decreases. As a result, the winding shaft rotates in the webbing retracting direction due to inertial force. Thus, even if the driving gear arrives at the terminal end position before the webbing becomes tense, the winding shaft continues to rotate in the webbing retracting direction until a tension balancing the inertial force of the winding shaft is generated in the webbing.

Therefore, if the inertial force generated in the winding shaft when the driving of the driving gear is completed is set large enough, even if the play in the webbing is large, the winding shaft can be rotated in the webbing retracting direction until the play in the webbing fitted around a passenger is removed.

The term rotation of the winding shaft due to inertial force used here means a rotating motion of the winding shaft generated by inertial force applied to the winding shaft. The inertial force to be applied to the winding shaft includes inertial force based on the mass of a gear or the like rotating through a link with the winding shaft as well as inertial force based on the mass of the winding shaft itself.

In the first aspect of the webbing winding device of the present invention, the gear train mechanism is preferably provided at a position at least corresponding to the terminal end position of one gear and along a pitch line, and has a toothless portion forming a gap between the driving gear and another adjacent gear when the driving of the driving gear is completed.

In the webbing winding device having the above structure, when the driving of the driving gear is completed, a gap is formed between at least one gear and a gear adjacent to this gear by the toothless portion. Thus, when the driving of the driving gear is completed, at least one pair of adjacent gears in the gear train mechanism can be separated. Therefore, blocking of the rotation of the winding shaft by the gear train mechanism can be prevented so that the winding shaft can be rotated in the webbing retracting direction by the inertial force.

According to a second aspect of the present invention, there is provided a webbing winding device having a pre-tensioner for tensioning a webbing for restraining a passenger in a passenger restraining direction in an emergency deceleration of a vehicle, the webbing winding device comprising: a winding shaft to which an end of the webbing is fixed; a gear train mechanism comprising a plurality of gears arranged in such a manner that adjacent gears mesh with each other, wherein a driving gear which receives an driving force when the pre-tensioner is actuated is driven from a starting end position to a terminating end position, which are set in advance, so as to rotate the winding shaft in a direction for retracting the webbing; and engagement release means which, when the driving of the driving gear is completed, moves at least one gear of the gear train mechanism to a position any from another adjacent gear so as to enable the winding shaft to be rotated in the webbing retracting direction by inertial force.

In the webbing winding device having the above structure, when the driving of the driving gear is completed, the engagement release means moves at least one gear in a gear train mechanism to a position away from another adjacent gear so as to enable the winding shaft to be rotated in the webbing retracting direction by inertial force. As a result, when the driving gear is driven, the winding shaft is rotated in the webbing retracting direction by torque transmitted from an output gear so that the webbing can be wound around the winding shaft. Further, when the driving of the driving gear is completed, at least one gear in the gear train mechanism is separated from another adjacent gear so that a rotation of the winding shaft in the webbing retracting direction is not blocked. Therefore, if there is play in the webbing when the driving of the driving gear is completed, the tension of the webbing acting or the winding shaft as a rotation load decreases so that the winding shaft is rotated in the webbing retracting direction by inertial force. Therefore, even if the driving gear arrives at the terminating end position before the webbing becomes tense, the winding shaft rotates in the webbing retracting direction until a tension balancing the inertial force of the winding shaft is generated.

In the webbing winding device according to the second aspect of the present invention, preferably the gear train mechanism comprises a pinion and a rack formed as the driving gear which meshes with the pinion, and the engagement releasing means has a guide member for changing a direction of movement of the rack moving along the pitch line with respect to the pinion at an intermediate position between the starting end position and terminating end position so as to release the rack from the pinion near the terminating end position.

In the webbing winding device having the above structure, the guiding member changes the direction of the moment of the rack moving along the pitch line relative to the pinion at an intermediate position and releases the rack from the pinion in the vicinity of the terminating end position. Therefore, because the rack can be released from the pinion when the driving is completed, blocking of a rotation of the winding shaft by the gear train mechanism can be prevented so that the winding shaft can be rotated in the webbing retracting direction by inertial force.

The pitch line mentioned here includes a pitch circle having a fixed curvature radius as well as a pitch line running in a straight line.

In the webbing winding device according to the second aspect of the present invention, preferably the gear train mechanism comprises a pinion and a rack constituted formed as the driving gear which meshes with the pinion and whose rear end tooth portion which corresponds to the terminating end position is separable from other remaining portions, and the engagement releasing means has a release guide member for changing a direction of movement of the rear end tooth portion moving along the pitch line with respect to the pinion at an intermediate position between the starting end position and terminating end position so as to release the rear end tooth portion from the pinion near the terminating end position.

In the rack of the webbing winding device having the structure, the rear end tooth which portion corresponds to the terminating end position is separable from the other remaining portions, and the release guiding member changes the direction of movement of the rear end tooth portion moving along the pitch line with respect to the pinion at an intermediate position. Further, the rear end tooth portion is released from the pinion near terminating end position. Thus, when the driving is completed, the rear end tooth portion of the rack can be separated from the pinion. Therefore, blocking of the rotation of the winding shaft by the gear train mechanism can be prevented so that the winding shaft can be rotated in the webbing retracting direction by inertial force.

In the webbing winding device according to the second aspect of the present invention, preferably the engagement release means comprises; a gear supporting body supporting at least one gear in the gear train mechanism movably along an axis; and a release driving member for moving a gear supported by the gear supporting body along the axis when the driving of the driving gear is completed along the axis so as to release the gear from other adjacent gears.

In the webbing winding device having the above structure, when the driving of the driving gear is completed, the release driving member moves the gear supported movably along the axis by the gear supporting body along the axis so as to release the gear from other adjacent gears. As a result, the blocking of the rotation of the winding shaft by the gear train mechanism can be prevented, so that the winding shaft can be rotated in the webbing retracting direction by inertial force.

According to a third aspect of the present invention, there is provided a webbing winding device having a pre-tensioner for a tensioning webbing for restraining a passenger in a passenger restraining direction in an emergency deceleration of a vehicle, the webbing winding device comprising: a winding shaft to which an end of the webbing is fixed; and a gear train mechanism comprising a plurality of gears including an internal gear, a sun gear and a planet gear which meshes with these gears, wherein a driving gear which receives an external driving force when the pre-tensioner is actuated is driven from a starting end position to a terminating end position, which are set in advance, so as to rotate the winding shaft in a direction for retracting the webbing, and when a driving of the driving gear is completed, the internal gear is supported movably along a pitch line of the internal gear so that the planet gear is capable of rotating in a direction corresponding to the webbing retracting direction.

In the webbing winding device having the above structure, when the pre-tensioner is actuated, the driving gear is driven from the starting end position to the terminating end position, which are set in advance, and when the driving of the driving gear is completed, a part or all of the internal gear moves along the pitch line of the internal gear so that the planet gear can rotate in a direction corresponding to the webbing retracting direction. Thus, when the pre-tensioner is actuated, the winding shaft is rotated in the webbing retracting direction by the torque transmitted from the gear train mechanism so that the webbing can be wound around the winding shaft. Further, when the driving of the driving gear is completed, the rotation of the winding shaft in the webbing retracting direction by the gear train mechanism is not blocked. Therefore, if there is a play in the webbing when the driving of the driving gear is completed, the tension in the webbing acting as a rotation load on the winding shaft decreases so that the winding shaft is rotated in the webbing retracting direction by inertial force. Thus, even if the driving gear arrives at the terminating end position before the webbing is tensed, the winding shaft rotates in the webbing retracting direction until a tension balancing the inertial force of the winding shaft is generated.

According to a fourth aspect of the present invention, there is provided a webbing winding device having a pre-tensioner for tensioning a webbing for restraining a passenger in a passenger restraining direction in an emergency deceleration of a vehicle, the webbing winding device comprising: a winding shaft to which an end of the webbing is fixed; and a gear train mechanism comprising a plurality of gears including a pinion and a rack which meshes with the pinion, wherein when the pre-tensioner is actuated, the rack which receives an external driving force when the pre-tensioner is activated is driven from a starting end position to a terminating end position, which are set in advance, so as to rotate the winding shaft in a webbing retracting direction, and a part or all of the rack is supported movably along the pitch line of the rack so that the pinion is able to be rotated in a direction corresponding to the webbing retracting direction when the driving of the rack is completed.

In the webbing winding device having the above structure, when the pre-tensioner is actuated, the rack meshing with the pinion is driven from the starting end position to the terminating end position, which are set in advance, and when the driving of the rack is completed, a part or all of the rack moves along the pitch line of the rack so that the pinion can rotate in a direction corresponding to the webbing retracting direction. Thus, when the pre-tensioner is actuated, the winding shaft is rotated in the webbing retracting direction by the torque transmitted from the gear train mechanism so that the webbing can be wound around the winding shaft. Further, when the driving of the rack is completed, the rotation of the winding shaft in the webbing retracting direction by the gear train mechanism is not blocked. Therefore, if there is play in the webbing when the driving of the driving gear is completed, the tension in the webbing acting as a rotation load on the winding shaft decreases so that the winding shaft is rotated in the webbing retracting direction by inertial force. Thus, even if the driving gear arrives at the terminating end position before the webbing is tensed, the winding shaft rotates in the webbing retracting direction until a tension balancing the inertial force of the winding shaft is generated.

BRIEF DESCRIPTION OF THE DRAWINGS

FIG. 3 is an axial plan view in axial direction showing a state after the actuation of the pre-tensioner of the webbing winding device according to the first embodiment of the present invention.

FIG. 6 is an axial sectional view showing a state prior to an actuation of the pre-tensioner of a webbing winding device to which a modification 2 of the gear train mechanism and guide member of the first embodiment is applied.

FIG. 19 is an axial plan view showing a release state in a rotation direction of the internal gear after the actuation of the pre-tensioner of the webbing winding device according to the fourth embodiment of the present invention.

FIG. 27 is an axial plan view showing a state after an actuation of the pre-tensioner in the webbing winding device to which the modification 1 of the rack according to the fifth embodiment of the present invention is applied.

DESCRIPTION OF THE PREFERRED EMBODIMENTS

Hereinafter, the embodiments of the present invention 1will be described with reference to the accompanying drawings.
(First Embodiment)

Figure 1:
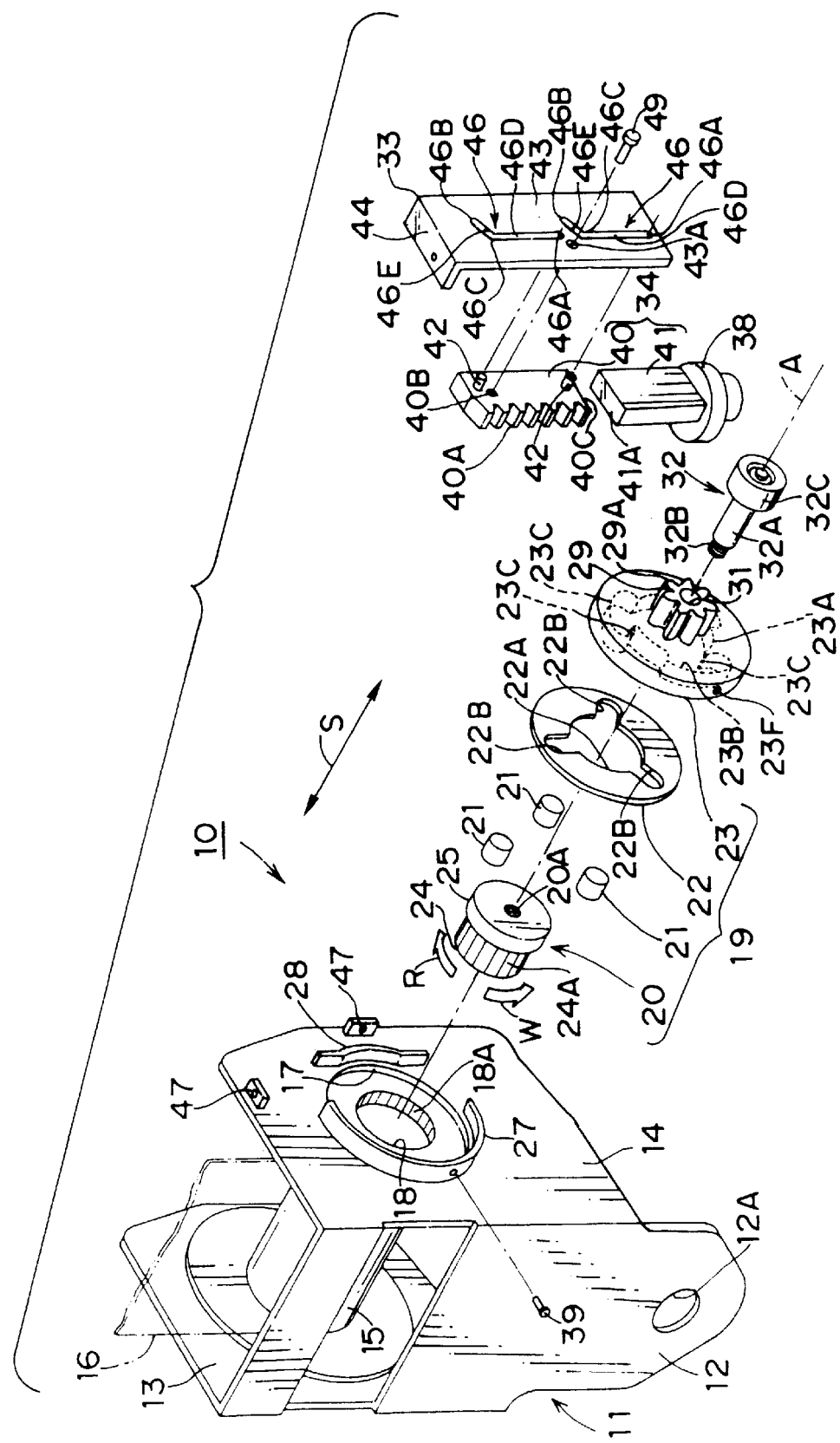
FIG. 1 is an exploded perspective view showing a structure of a webbing winding device according to a first embodiment of the present invention.
Figure 2:
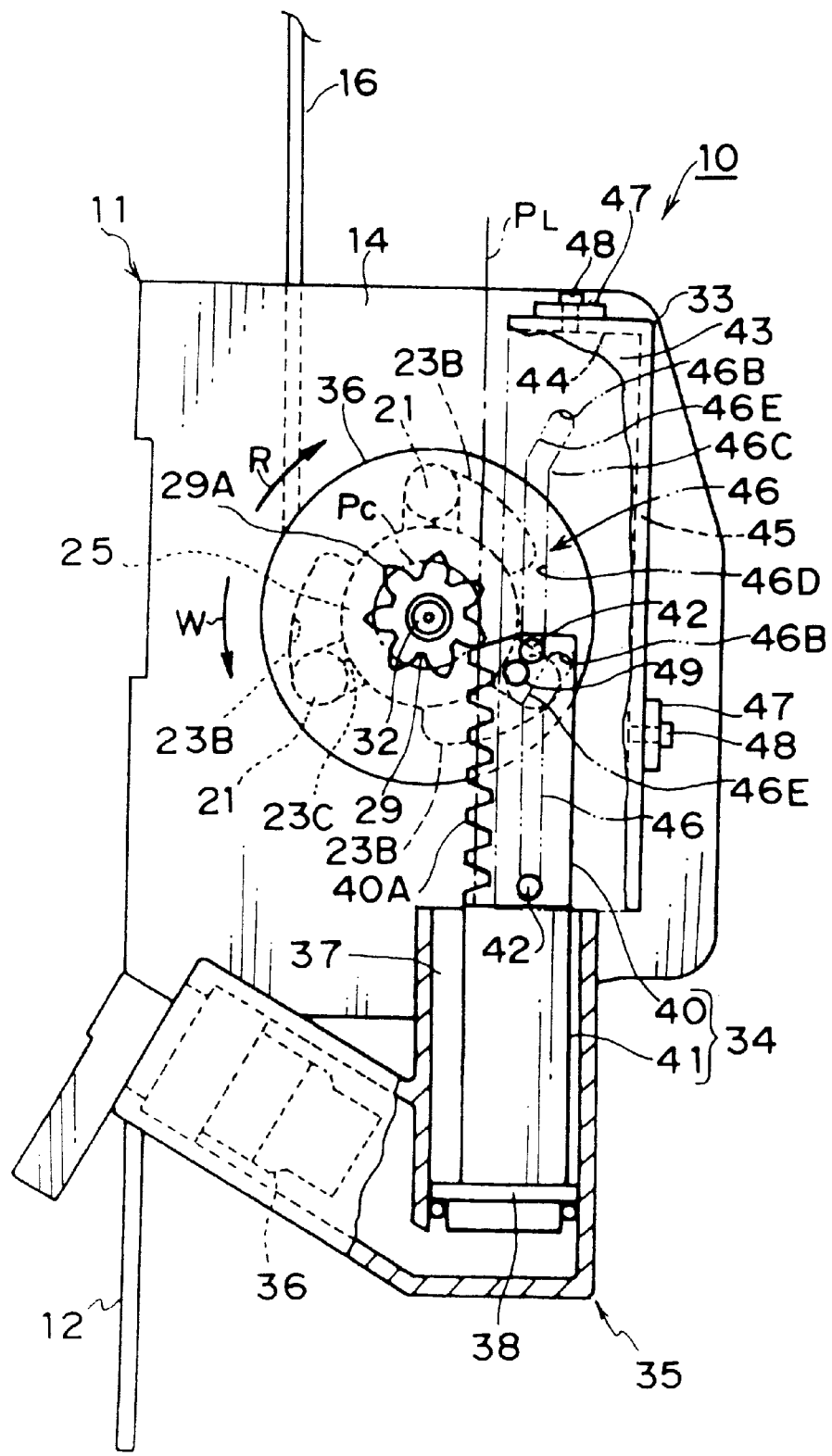
FIG. 2 is an axial plan view showing a state prior to an actuation of the pre-tensioner of the webbing winding device according to the first embodiment of the present invention.

FIGS. 1–3 show a webbing winding device 10 according to the first embodiment of the present invention. As shown in FIG. 1, the webbing winding device 10 has a frame 11 which is fixed to a vehicle body. This frame 11 comprises a plate 12 in which is formed a through hole 12A through which is inserted a bolt or the like to be fastened to the vehicle, and a pair of side plates 13, 14 which are bent from both sides of the plate 12 at a right angle such that they are parallel to each other. The frame 11 rotatably supports a spool 15 which is a winding shaft with the side plates 13, 14. One end of the webbing 16 for restraining a passenger is fixed to the spool 15. A circular opening 17 is formed in one side plate 14 around an axis A which is a rotation center of the spool 15. A circular concave engagement hole 18 is formed around the axis A in a side face of the spool 15 facing this circular opening 17.

A one-way clutch 19 is disposed outside the side plate 14 of the frame 11. This one-way clutch 19, as shown in FIG. 1, comprises a torque transmission shaft 20, cylindrical rollers 21, a holding plate 22 and a rotor 23. The torque transmission shaft 20 comprises a spline shaft portion 24 and an inner wheel portion 25, these portions being formed each in the form of a cylinder having a different outside diameter. The spline shaft portion 24 having a smaller diameter and the inner wheel portion 25 having a larger diameter are provided coaxially and integrally with each other. Spline teeth 24A extending in the same direction as the axis A are formed on an outer peripheral face of the spline shaft portion 24 at a predetermined pitch in the circumferential direction. Spline grooves 18A having a shape corresponding to the shape of the spline teeth 24A of the spline shaft portion 24 are formed on an inner peripheral face of the engagement hole 18 at the same pitch as the spline teeth 24A. As a result, if the spline shaft portion 24 is inserted into the engagement hole 18 so that the spline teeth 24A engage with the spline grooves 18A, the torque transmission shaft 20 is supported on the axis A of the spool 15 and connected to the spool 15 such that it rotates integrally with the spool 15. Further a screw hole 20A penetrating along the axis A is formed in an outer side face in the axial direction S of the torque transmission shaft 20.

The holding plate 22 of the one-way clutch 19 is formed in the form of a thin circular plate. The outside diameter thereof is slightly smaller than the inside diameter of the circular opening 17 of the side plate 14. A circular opening portion 22A having a diameter slightly larger than the outside diameter of the inner wheel portion 25 of the torque transmission shaft 20 is formed in the central portion of the holding plate 22. Three roller holding portions 22B are formed by cutting U shapes extending outwards from the inner peripheral face of the opening portion 22a in a radial direction. The roller holding portions 22B are formed slightly wider than the diameters of the roller 21. These roller holding portions 22B are provided at equal intervals (at intervals of 120°) in the circumferential direction around the axis A.

The opening portion 22A of the holding plate 22 is fitted around the outside peripheral face of the inner wheel portion 25 and the holding plate 22 is then placed on a side face of the spool 15 via a circular opening 17 of the side plate 14. As a result, the holding plate 22 is held in a ring-like concave portion formed by the outside peripheral face of the inner wheel portion 25 and the inside peripheral face of the circular opening 17 in the radial direction and is positioned coaxially with the spool 15.

The center axis of each of the three rollers 21 is parallel to the axis A. The three rollers 21 are placed against a side face of the spool 15 passing through each of the roller holding portions 22B. As a result, the three rollers 21 are positioned at equal interval in the circumferential direction by the roller holding portions 22B. If the holding plate 22 is rotated around the axis A, they slide on the side face of the spool 20 in the circumferential direction with the equal interval maintained by the holding plate 22.

A rotor 23 is configured as an outside wheel of the one-way clutch 19 and formed in a circular shape having a larger thickness than a height of the inner wheel portion 25 in the axial direction S as shown in FIG. 1. An inner wheel accommodating chamber 23A and three roller accommodating chambers 23B communicating with the inner wheel accommodating chamber 23A are formed in this rotor 23. The inner wheel accommodating chamber 23A and roller accommodating chambers 23B are open to the side of the spool 15 of the rotor 23. The inner wheel accommodating chamber 23A forms a cylindrical space corresponding to the inner wheel portion 25 inside the rotor 23 and each of the roller accommodating chambers 23B forms a space extending outward from the inner peripheral face of the inner wheel accommodating chamber 23A. These spaces are provided at equal intervals (120°) in the circumferential direction around the axis A. Each of the roller accommodating chambers 23B is formed in a substantially elongated ellipse shape extending in a spiral direction around the axis A as shown in FIG. 2. Partition wall-like stopper protrusions 23C are formed along an inner peripheral face of the inner wheel accommodating chamber 23A between an outside end of each roller accommodating chamber 23B in the spiral direction and the inner wheel accommodating chamber 23A. The roller accommodating chambers 23B form substantially wedge-like spaces which gradually narrow in width, when looked at axially, toward the inside in the spiral direction between the roller accommodating chambers 23B and an outside peripheral face of the inner wheel portion 25 accommodated in the inner wheel accommodating chamber 23A. Further, the rotor 23 has a pinion 29 provided integrally and coaxially therewith on an outside side face in the axial direction S as shown in FIG. 1. A center hole 31 is made through this pinion 29 and the center hole 31 communicates with the inner wheel accommodating chamber 23A in the rotor 23.

The rotor 23 is placed against the side face of the spool 15 with the holding plate 22 therebetween and accommodates the inner wheel portion 25 of the torque transmission shaft 20 coaxially within the inner wheel accommodating chamber 23A. At the same time, the rollers 21 are accommodated in the three roller accommodating chambers 23B. A pair of curved guide plates 27 and 28 are provided on the side face 14 so as to surround an outside peripheral face of the rotor 23 placed against the side face of the spool 15 as shown in FIG. 1. Inner peripheral faces of these guide plates 27 and 28 are curved at a curvature radius slightly larger than an outside peripheral face of the rotor 23 around the axis A. This restricts the motion of the rotor 23 and pinion 29 in the radial direction so that they are positioned coaxially with the spool 15.

When the rotor 23 and pinion 29 are positioned coaxially with the spool 15, a connecting member 32 is inserted into a center hole 31 of the pinion 29. The connecting member 32 is a thrust bearing comprising a round bar like shaft portion 32A, a male threaded portion 32B provided at a front end of this shaft portion 32A and a head portion 32C supported at a rear end of the shaft portion 32A coaxially therewith as shown in FIG. 1. The head portion 32C is supported rotatably by the shaft portion 32A so as to suppress a rotation resistance of the rotor 23 and pinion 29.

The shaft portion 32A of the connecting member 32 is inserted through the center hole 31 in the pinion 29 and the male threaded portion 32B is driven into the threaded hole 20A in the torque transmission shaft 20. As a result, the connecting member 32 fixes the rotor 23 and the pinion 29 to the torque transmission shaft 20 in the axial direction S and at the same time, supports the rotor 23 and the pinion 29 rotatably around the axis A. Therefore, the rotor 23 and the pinion 29 are capable of rotating relative to the spool 15 and the torque transmission shaft 20.

The webbing winding device 10 having the above structure is mounted on a vehicle body in a state in which the one-way clutch 19 is not transmitting torque to the spool 15, that is, in an OFF state in which the spool 15 is separated from the pinion 29. In this OFF state, relative positions of the holding plate 22 and the rotor 23 are adjusted so as to hold each of the rollers 21 within an end portion on the outside of each roller accommodating chamber 23B as shown in FIG. 2. At this time, the stopper protrusion 23C of the roller accommodating chamber 23B stops the roller 21 and holds it at a position removed from the outside peripheral face of the inner wheel portion 25. Consequently, because the torque transmission shaft 20 is placed in an OFF state in which no torque is transmitted between the torque transmission shaft 20 and the rotor 23 even if the pinion 29 is locked so that it is not capable of rotating, the spool 15 is capable of rotating in both the retracting direction W and the feeding out direction R of the webbing 16.

On the other hand, in the frame 11, as shown in FIG. 2, a rack 34 which meshes with the pinion 29, a piston driving unit 35 for the pre-tensioner connected to this rack 34 and a guide frame 33 for restricting the direction of movement of the rack 34 are disposed on an outer side face of the side plate 14.

The rack 34 is separable into two parts, as shown in FIG. 1 and comprises a tooth portion 40 disposed at the distal end thereof in the longitudinal direction and a rod portion 41 disposed at the proximal end. The tooth portion 40 and the rod portion 41 are formed in a substantially rectangular thick plate form with the pitch line $P_L$ running in the longitudinal direction, as shown in FIG. 2. Teeth 40A which mesh with the teeth 29A of the pinion 29 are formed continuously in the direction of the pitch line $P_L$ on one side end face in the transverse direction which is perpendicular to the pitch line $P_L$, as shown in FIG. 2. Further, a pair of guide pin s 42 is provided on an outer side face of the tooth portion 40 in the axial direction S so that they project in the axial direction S. This pair of guide pins 42 are disposed at the distal and proximal end portions of the tooth portion 40 in the longitudinal direction thereof and are positioned on a straight line parallel to the pitch line $P_L$. Further, an insertion hole 40B is formed the side face of the tooth portion 40 on which the guide pins 42 are provided, such that it is located slightly closer towards the proximal end than the guide pin 42 at the distal end and is offset towards the teeth 40A as shown in FIG. 1. A pressure receiving face 40C which is a flat surface orthogonal to the longitudinal direction of the tooth portion 40 is formed on the proximal end face thereof. On the other hand, the proximal end in the longitudinal direction of the rod portion 41 of the rack 34 is connected to the piston driving unit 35. A pressure applying face 41A which is a flat surface orthogonal to the longitudinal direction is formed on the distal end face of the rod portion 41 in the longitudinal direction.

As is shown in FIG. 1, the guide frame 33 to be disposed on the side plate 14 comprises a rectangular plate portion 43 which is to be disposed on the side plate 14 with the longitudinal direction thereof parallel with the direction of the pitch line $P_L$ (the pitch line direction) and leg portions 44 and 45 (see FIG. 2) which are bent at right angles from the distal end of the plate portion 43 in the longitudinal direction thereof and the outside end of the plate portion 43 in the transverse direction thereof respectively. These leg portions 44 and 45 have the same dimensions as each other in the axial direction S. The guide frame 33 is disposed on the side plate 14 such that the end faces of the leg portions 44 and 45 in the axial direction S abut the outer side face of the side plate 14. Consequently, the plate portion 43 is supported parallel to the side plate 14 by the leg portions 44, 45.

As shown in FIG. 2, a pair of elongated guide grooves 46 is formed running along the direction of the pitch line $P_L$ in the plate portion 43. Here, one guide groove 46 is disposed at the distal end portion in the longitudinal direction corresponding to the guide pin 42 at the distal end of the tooth portion 40. The other guide groove 46 is disposed at the proximal end portion in the longitudinal direction corresponding to the guide pin 42 at the proximal end of the tooth portion 40. In each of these guide grooves 46, a range from a starting end 46A at the proximal end in the longitudinal direction of the guide grooves 46 as far as an intermediate point 46C just before a terminal end 46B at the distal end in the longitudinal direction of the guide grooves 46 is a parallel portion 46D formed parallel to the pitch line $P_L$, while a range from the intermediate point 46C as far as the terminal end 46B is an inclined portion 46E which slopes away from the pitch line $P_L$. A through hole 43A is formed in the plate portion 43 at a position corresponding to the insertion hole 40B of the tooth portion 40, as shown in FIG. 1.

A pair of positioning plates 47 for positioning the guide frame 33 is disposed on an outer side face of the side plate 14. These positioning plates 47, as shown in FIG. 2, are in firm contact with the outside faces of the leg portions 44 and 45 of the guide fame 33 placed on the side plate 14 so as to position the guide frame 33. At this time, fixing screws 48 are screwed into each of the leg portions 44 and 45 of the guide frame 33 through each of the positioning plates 47 enabling the guide frame 33 to be fixed to the side plate 14.

In the guide frame 33 placed on the side plate 14, the pair of guide pins 42 on the rack 34 are inserted into the pair of guide grooves 46. A shear pin 49 made of resin inserted through the plate portion 43 is inserted through the insertion hole 40B of the tooth portion 40 50 that movement of the tooth portion 40 in the direction of the pitch line is blocked. At this time, the tooth portion 40 is held at a position (starting end position) in which, as shown in FIG. 2, the pair of guide pins 42 are in contact with the starting end 46A of guide groove 46 and the pressure receiving face 40C is in firm contact with the pressure applying face 41A of the rod portion 41.

The piston driving apparatus 35 supports the rod portion 41 of the rack 34 movably along the pitch line $P_L$ which is contiguous contact with a pitch circle $P_C$ of the pinion 29. The piston driving apparatus 35 comprises a gas generator 36, a piston cylinder 37 into which high pressure gas generated by this gas generator 36 is introduced and a piston 38 disposed within this piston cylinder 37. The piston 38 is supported slidably along an inner wall of the piston cylinder 37, forming an air chamber of a variable volume sealed from the outside together with the piston cylinder 37. A proximal end face of the rod portion 41 of the rack 34 is fixed to the face of the piston 38 open to the air, i.e. on the opposite side to the air chamber. When the webbing winding device 35 is assembled in the frame 11, the piston 38 is held at a position at which the volume of an internal air chamber formed within the piston cylinder 37 is at the minimum, as shown in FIG. 2.

When the webbing winding unit 10 is mounted on to the vehicle body, the rotor 23 is temporarily blocked from rotation by a shear pin 39 (see FIG. 1) inserted through a temporary blocking hole 23F provided on an outer peripheral face of the rotor 23 through the guide plate 27. At this time, a tooth face of the distal end side of the tooth 40A at the distal end of the rack 34 is brought into contact with a single tooth of the pinion 29 located on the pitch line $P_L$.

Next, the action and operation of the webbing winding device 10 of the present embodiment having the above described structure will be described. The gas generator 36 of the piston driving apparatus 35 is connected to an ignition power supply (not shown). If an emergency deceleration detecting sensor (not shown) detects an emergency deceleration of the vehicle due to a collision or the like, this ignition power supply is actuated so as to supply an ignition current to the gas generator 36. When this ignition current is supplied, the gas generator 36 generates a high pressure gas and supplies this high pressure gas to the piston cylinder 37. As a result, the piston 38 is made to slide in a direction for expanding the volume in the air chamber of the piston cylinder 37 by the high pressure gas so that the rod portion 41 of the rack 34 is moved linearly along the pitch line $P_L$. At this time, a pressing force in the pitch line direction is transmitted to the tooth portion 40 of the rack 34 via the rod portion 41. When this pressing force is received, the tooth portion 40 shears the shear pin 49 and starts to move. During the period of initial movement, the direction in which the tooth portion 40 moves is restricted by the parallel portion 46D in the guide groove 46 of the plate portion 43. The tooth portion 40 moves along the pitch line $P_L$ with the teeth 40A meshing with the teeth 29A of the pinion 29 from the starting end position up to a release starting position which corresponds to the intermediate point 46C of the guide groove 46. If the tooth 40A at a front end of the tooth portion 40 which is moved linearly by a driving force from the driving apparatus 35 presses the tooth 29A of the pinion 29, the pinion 29 converts the pressing force from the tooth portion 40 to a rotation force. The shear pin 39 is sheared by this rotation force so that the pinion 29 and the rotor 23 begin to rotate in the reacting direction W.

At this time, the rotor 23 rotates in the reacting direction W relative to the holding plate 22. As a result, as shown in FIG. 2, each of the rollers 21 in the roller accommodating chambers 23B is moved from the position (OFF position) in which the roller 21 is stopped by the stopper protrusion 23C to an ON position in which the roller 21 is nipped by the a pressure from the outer peripheral face of the inner wheel portion 25 and the inner peripheral face of the roller accommodating chamber 23B as shown in FIG. 3.

When the roller 21 is moved up to the ON position, the rotor 23 is connected to the torque transmission shaft 20 in the rotation direction so that the one-way clutch 19 enters into an ON state in which it is able to of transmit torque from the pinion 29 to the spool 15. Consequently, the spool 15 is rotated in the retracting direction W integrally with the rotor 23 and pinion 29.

Then, when the tooth portion 40 moves up to the release starting position together with the rod portion 41, the pair of guide pins 42 of the tooth portion 40 enter from the parallel portion 46D of the guide groove 46 into the inclined portion 46E. As a result, the tooth portion 40 is inclined with respect to the pitch line $P_L$ and the direction of movement thereof is restricted to a direction in which it moves away from the piston driving unit 35. Therefore, the tooth portion 40 is advanced in the pitch line direction by a driving force from the piston driving unit 35 and moves away from the pinion in the radial direction relative to the axis A with the pressure receiving face 40C sliding along the pressure applying face 40A of the rod portion 41. In the tooth portion 40, when the guide pin 42 of the rack 34 is moved by a driving force from the piston driving apparatus 35 to a position (terminal position) at which it reaches the terminal end 46B of the guide groove 46, the engagement between the teeth 40A and the teeth 29A is released at a position just before this terminal position. Therefore, the tooth portion 40 is held at the terminal position away from the pinion 29, as shown in FIG. 3, when the operation of the piston driving apparatus 35 is terminated.

In the webbing winding device 10 of this embodiment, if the pre-tensioner is actuated or the piston driving apparatus 35 is actuated so that the one-way clutch 19 is placed in an ON state, the rack 34 which is a driving gear is driven from the beginning position to the release starting position. As a result, torque in the retracting direction W is transmitted from the pinion 29, which constitutes the gear train mechanism together with this rack 34, to the spool 15. If there is play in the webbing 16 worn by a passenger, the spool 15 is rotated quickly in the retracting direction W by the torque, so that the webbing 16 is wound onto the spool 15. At this time, if the play of the webbing 16 is slight, the piston driving apparatus 35 rotates the spool 15 in the retracting direction until the play of the webbing 16 is eliminated. Even if the rack 16 has moved only partway to the terminal position and has not separated from the pinion 29, the piston 38 is stopped when a tension balancing a gas pressure in the piston cylinder 37 is generated in the webbing 16.

On the other hand, if the rack 34 moves away from the pinion 29 just before the terminal end position, an inertial force based on the mass of the rotor 23, pinion 29 and the like which rotate integrally with the spool 15 as well as an inertial force based on weight of the spool 15 is applied to the spool 15 as a rotation force in the retracting direction W. Thus, if there is still play in the webbing 16 when the rack 34 moves away from the pinion 29, because the tension of the webbing 16 acting on the spool 15 as a rotation load is small and a large inertial force acts on the spool 15 which is rotating at high speed, the spool 15 continues its rotation in the retracting direction W. Then, if a tension balancing the inertial force of the spool 15 is generated in the webbing 16, the rotation of the spool 15 is stopped. Therefore, even if the play in the webbing 16 is large just before the piston driving apparatus 35 is actuated, the rack 34 does not block the rotations of the pinion 29 and the spool 15 but the rotation of the spool 15 in the retracting winding direction W can be continued until the play of the webbing 16 is removed completely.

(Modification 1 of the First Embodiment)

Figure 4:
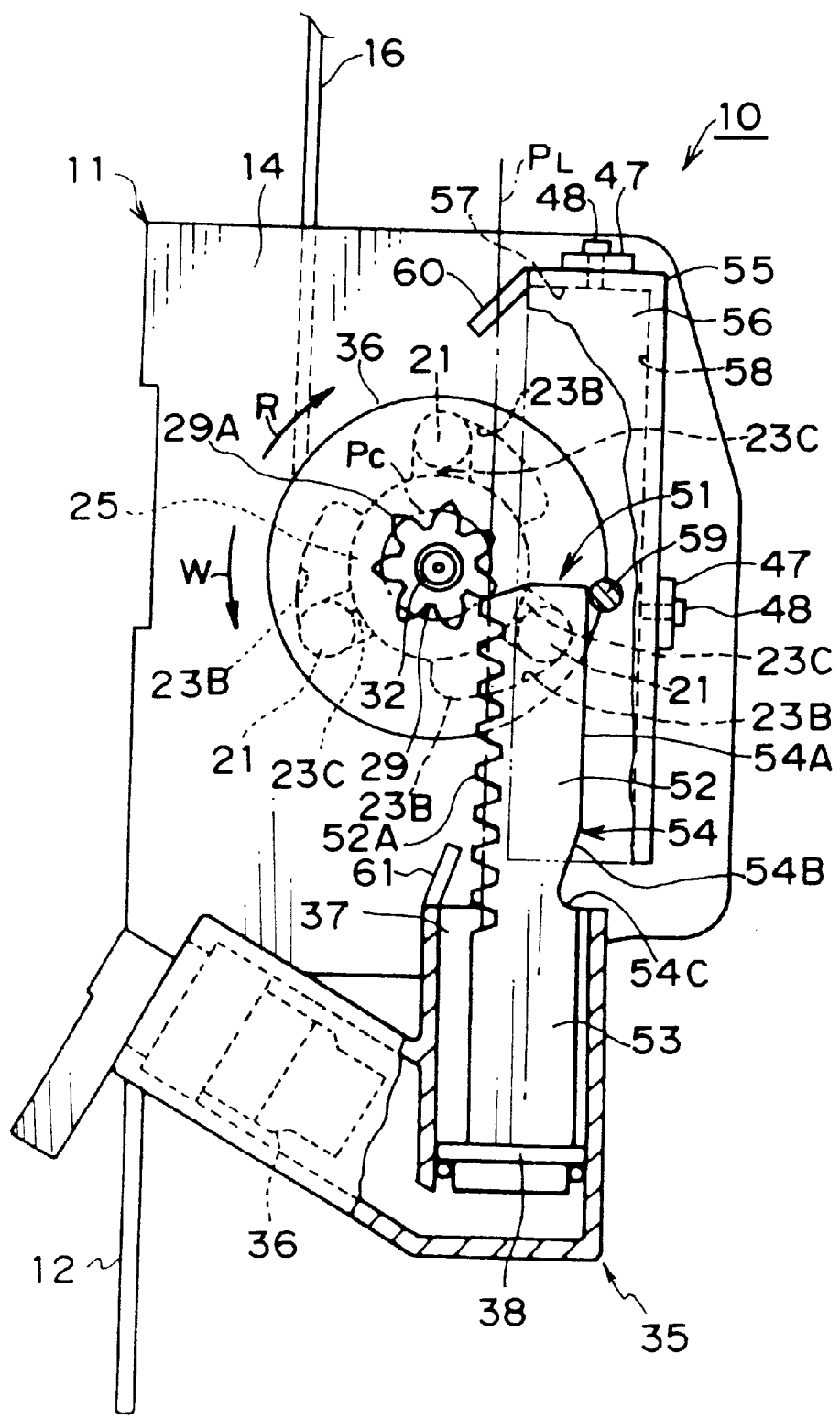
FIG. 4 is an axial sectional view showing a state prior to an actuation of the pre-tensioner of a webbing winding device to which a modification 1 of the gear train mechanism and guide member of the first embodiment is applied.
Figure 5:
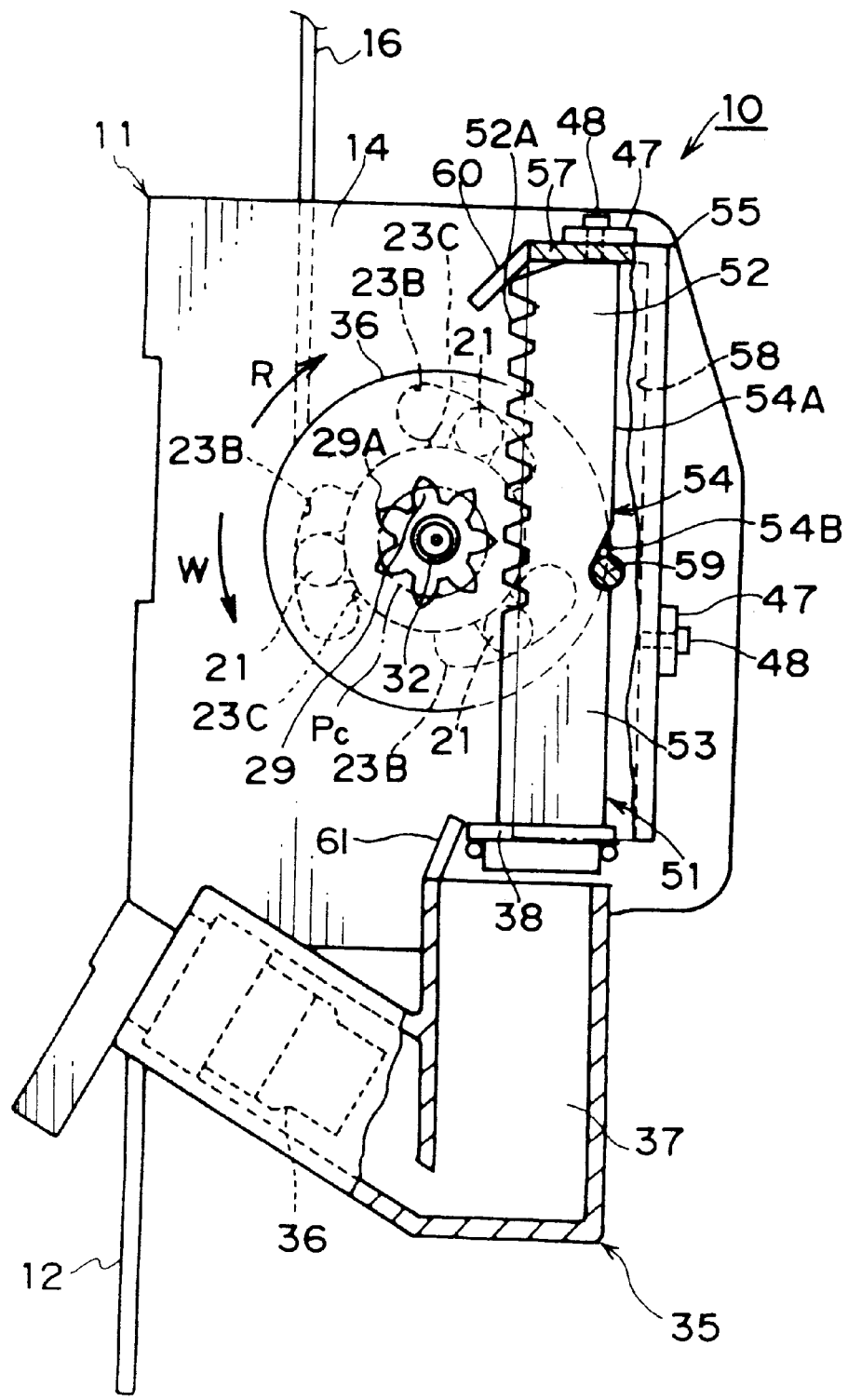
FIG. 5 is an axial sectional view showing a state after an actuation of the pre-tensioner of a webbing winding device to which a modification 1 of the gear train mechanism and guide member of the first embodiment is applied.

Modification 1 of the gear train mechanism and guide member according to the first embodiment of the present invention will be described with reference to FIGS. 4 and 5. A rack 51 is structured so that a tooth portion 52 and a rod portion 53 are integrated as shown in FIG. 4. Teeth 52A which mesh with teeth 29A of the pinion 29 are formed continuously on one side end face in the transverse direction of the tooth portion 52. The other side end face which is on the opposite side to the teeth 52A acts as a guide face 54 of the tooth portion 52. This guide face 54 is formed over a range corresponding to the traveling stroke of the rack 51 from the distal end of a side end face of the tooth portion 52 to the proximal end face thereof. A range corresponding to the distance from the starting end position of the rack 51 to the release starting position is a parallel portion 54A comprising a flat surface parallel to the pitch line $P_L$ and a range corresponding to the distance from the release starting position of the rack 51 to the terminal end position is an inclined portion 54B comprising an inclined flat surface which slope towards the pitch line $P_L$ as it approaches the proximal end. Further, in the guide face 54, a stopper portion 54C comprising a flat surface parallel to the transverse side direction of the rack 51 is formed at the proximal end of the inclined portion 54B.

A guide frame 55 disposed on the side plate 14 comprises a rectangular plate portion 56 whose longitudinal direction is parallel to the pitch line direction and leg portions 57 and 58 which are bent at right angles from the distal end in the longitudinal direction of the plate 56 and an outer side end in transverse direction. These leg portions 57 and 58 have the dimensions as each other same in the axial direction S. The guide frame 55 is mounted on the side plate 14 such that the end faces of the leg portions 57 and 58 in the axial direction S abut an outer side face of the side plate 14. The guide frame 55 is positioned at a predetermined position by positioning plates 47 on the side plate 14 and fastened thereto with fastening screws 48.

The plate portion 56 has a guide pin 59 provided on an inner side face thereof facing the side plate 14 so as to project in the axial direction S. This guide pin 59 is supported so as to be in contact with the guide face 54 of the rack 51. When the piston driving unit 35 is not actuated, i.e. when the rack 51 is located at the beginning position, the guide pin 59 is in contact with the vicinity of the distal end of the parallel portion 54A of the guide face 54, as shown in FIG. 4. Further, a guide piece 60 is provided in the side end portion of the leg portion 57 at the distal end of the guide frame 55 on the side thereof closest to the pitch line $P_L$. This guide piece 60 extends from a side end of the leg portion 57 to a position intersecting the pitch line $P_L$ and is substantially parallel to the inclined portion 54B of the guide face 54 in the rack 51.

A guide piece 61 extending towards the distal end of the rack 51 is provided at an end of the piston cylinder 38. This guide piece 61 is inclined with respect to the pitch line $P_L$ such that it approaches the teeth 51A of the rack 51 from the distal end of the piston cylinder 38 the closer to the distal end of the rack 51. The guide piece 61 and guide frame 55 together form the guide member.

Next, the action and operation of the webbing winding device 10 according to the first embodiment having the gear train mechanism and guide member having the above structures will be described. If the piston driving apparatus 35 is actuated, the gas generator 36 generates a high pressure gas and supplies it to the piston cylinder 37. The piston 38 is made to slide in a direction for expanding the volume of the air chamber in the piston cylinder 37 by this high pressure gas thereby moving the rack 51 located at the starting end position along the pitch line $P_L$. During in the initial period of traveling of the rack 51, the guide pin 59 of the plate portion 56 is in contact with the parallel portion 54A of the guide faces 54 so as to restrict the traveling of the rack 51 to liner along the pitch line $P_L$. As a result, the rack 51 moves along the pitch line $P_L$ with the teeth 51A thereof meshing with the teeth 29A of the pinion 29 from the starting end position to the release start position. The pinion 29 converts pressure from the rack 51 moving linearly along the pitch line $P_L$ into rotation force. This rotation force rotates the pinion 29 and the rotor 23 in the retracting direction relative to the holding plate 22. As a result, as shown in FIG. 4, each of the rollers 21 in the roller accommodating chambers 23B is moved from a position (OFF position) in which the roller 21 is stopped by the stopper protrusion 23C to an ON position in which the roller 21 is nipped by the a pressure from the outer peripheral face of the inner wheel portion 25 and the inner peripheral face of the roller accommodating chamber 23B, as shown in FIG. 5.

When the roller 21 is moved to the ON position, the rotor 23 is connected to the torque transmission shaft 20 in the rotation direction so that the one-way clutch 19 is placed in an ON state in which it is able to transmit torque from the pinion 29 to the spool 15. Consequently, the spool 15 is rotated at high speed in the retracting direction W integrally with the rotor 23 and pinion 29 so that the webbing 16 is retracted by the rotor 23.

When, if the rack 51 is moved up to the release start position, the piston 38 is discharged from the piston cylinder 37. At the same time, a tooth face of the first tooth 51A at the distal end of the rack 51 moved along the pitch line $P_L$ by the inertial force comes into contact with the guide piece 60 while an outer peripheral end portion of the piston 38 comes into contact with the guide piece 61. A component of force acts on the piston 38 and rack 51 so as to move the piston 38 and the rack 51 away from the pinion 29. The teeth 51A of the rack 51 are in contact with the teeth 29A of the pinion 29 at a pressure angle of about 20°. As a result, when the pinion 29 is about begins to rotate in the retracting direction W due to the inertial force, a component of force is applied to the rack 51 in a direction perpendicular to the pitch line $P_L$ and moving away from the pinion 29.

Therefore, the rack 51 is advanced in the pitch line direction from the release start position by the inertial force and at the same time moved in a direction away from the pinion in the radial direction relative to the axis A with the inclined portion 54B of the guide face 54 sliding on the guide pin 59. The rack 51 is moved to the terminal position where the distal face thereof comes into contact with the leg portion 57 because of the inertial force and at the same time the guide pin 59 is in contact with the stopper portion 54C of the guide face 54. The engagement between the teeth 51A and the teeth 29A is released just before this terminal position. Therefore, when the driving of the rack 51 by the piston driving unit 35 is completed, the rack 51 is held at the terminal position away from the pinion 29, as shown in FIG. 5.

If, in the webbing winding device 10 of the first embodiment to which the modification 1 of the gear train mechanism and guide member is applied, there is a play in the webbing 16 when the driving of the rack 51 by the piston driving apparatus 35 is completed, the rack 51 does not lock the rotations of the pinion 29 and the spool 15 and the rotation of the spool 15 can be continued in the retracting direction W due to the inertial force until the play of the webbing 16 is removed completely.

(Modification 2 of the First Embodiment)

Modification 2 of the gear train mechanism and guide member according to the first embodiment will now be described with reference to FIGS. 6 and 7. As shown in FIG. 6, a rack 65 for meshing with the pinion 29, the piston driving apparatus 35 connected to this rack 65 and a guide frame 66 for restricting the direction of travel of the piston 34 are disposed on an outer side face of the side plate 14.

Figure 7:
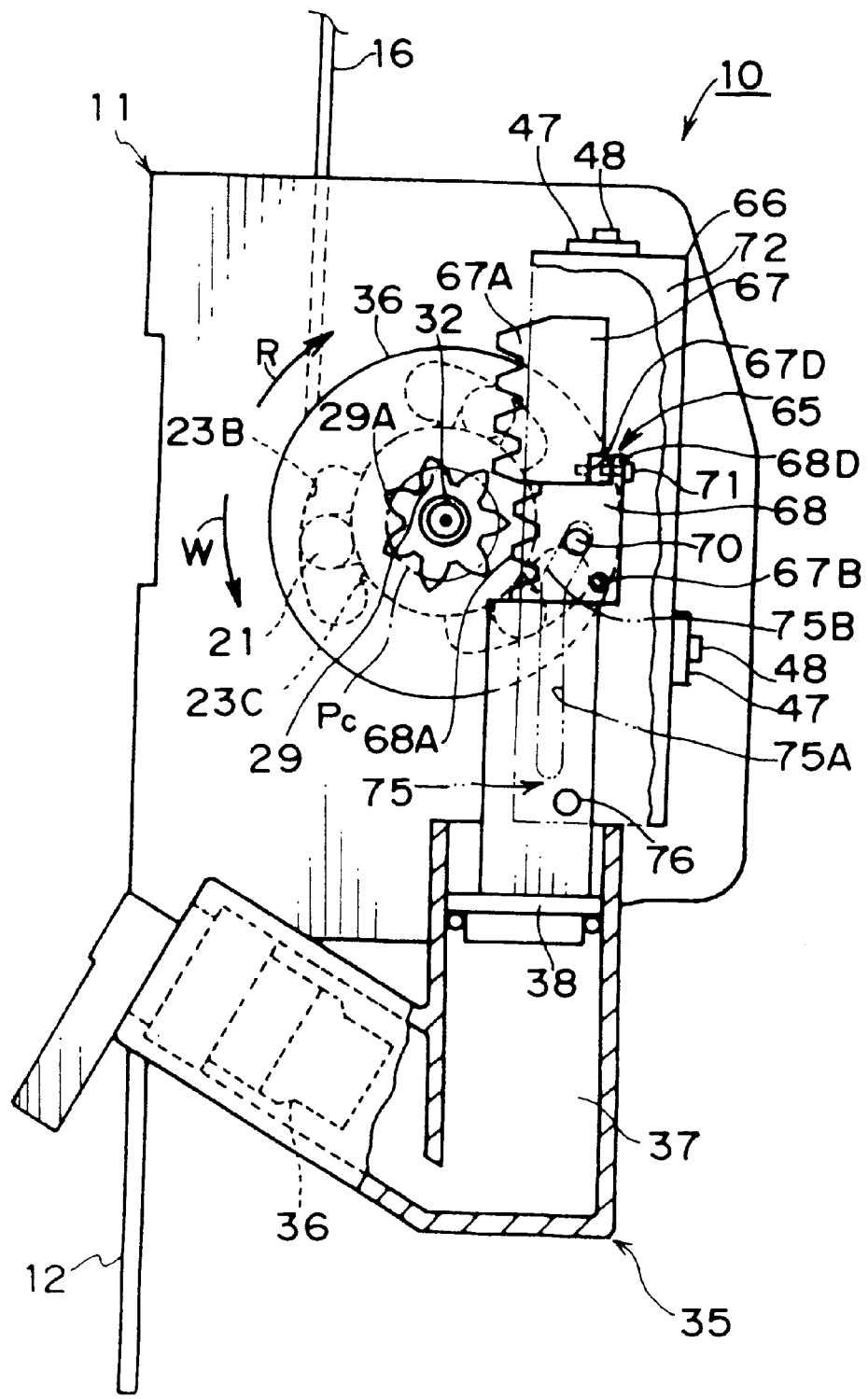
FIG. 7 is an axial sectional view showing a state after an actuation of the pre-tensioner of a webbing winding device to which a modification 2 of the gear train mechanism and guide member of the first embodiment is applied.

The rack 65 is separable into three parts, as shown in FIG. 7, and comprises a distal end tooth portion 67 disposed at the distal end in the longitudinal direction, a proximal end tooth portion 68 disposed in the intermediate portion and a rod portion 69 disposed at the proximal end. The tooth portions 67 and 68 and the rod portion 69 are each formed as a substantially rectangular thick plate with the pitch line $P_L$ as the longitudinal direction thereof. Teeth 67A and 68A which mesh with the teeth 29A of the pinion 29 are formed continuously on one side face in the transverse direction of the tooth portions 67 and 68, as shown in FIG. 6. A guide pin 70 and an insertion hole 67B are provided on an outer side face of the proximal end tooth portion 68 in the axial direction S, as shown in FIG. 7.

A pressure receiving face 67C made of a flat surface orthogonal to the longitudinal direction thereof is formed on the proximal end face of the distal end tooth portion 67. An engaging concave portion 67D which is indented in a step shape towards the distal end of the distal end tooth portion 67 is formed in the outer side end portion in the transverse direction of the pressure receiving face 67C. On the other hand, a pressure applying face 68C made of a flat surface orthogonal to the longitudinal direction thereof is formed on the distal end face of the proximal end tooth portion 68. This pressure applying face 68C has an engaging convex portion 68D provided at an outer end portion in the transverse direction corresponding to the engaging concave portion 67D of the distal end tooth portion 67.

An insertion hole is formed in a side face in the transverse direction of the engaging concave portion 67D and an insertion hole which is a through hole in the transverse direction is also formed in the engaging convex portion 68D. The pressure receiving face 67C and the pressure applying face 68C are brought into contact with each other, as shown in FIG. 6 and the engaging concave portion 67D is fit to the engaging convex portion 68D. A connecting pin 71 is then passed through the through hole and inserted into insertion hole, so that the tooth portions 67 and 68 are supported with their respective pitch lines $P_L$ on the same line.

The proximal end face of the proximal end tooth portion 68 and the distal end face of the rod portion 69 act as the pressure applying face 68F and the pressure receiving face 69A, respectively, each comprising a flat surface orthogonal to the longitudinal direction. Moreover, the proximal end tooth portion 68 and the rod portion 69 are supported with the pressure applying face 68F and the pressure receiving face 69A being in firm contact with each other. A proximal end face of the rod portion 69 is fixed to the piston 38 in the piston cylinder 37.

A guide frame 66 mounted on the side plate 14 comprises a rectangular plate portion 72 disposed on the side plate 14 so as to have the direction (pitch line direction) of the pitch line $P_L$ as the longitudinal direction thereof, as shown in FIG. 6, and leg portions 73 and 74 bent at right angles from the distal end portion in the longitudinal direction of this plate portion 72 and an outer side end in the transverse direction respectively, towards the side plate 14. These leg portions 73 and 74 have the same dimensions as each other in the axial direction S. The guide frame 66 is disposed on the side plate 14 such that the end faces in the axial direction S of the leg portions 73 and 74 are in contact with the outer side face of the side plate 14. As a result, the plate portion 72 is supported so as to be parallel to the side plate 14 by the leg portions 73 and 74.

The plate portion 72 has a guide groove 75 formed so as to extend along the pitch line $P_L$. Here, the guide groove 75 is disposed at a position corresponding to the guide pin 70 on the proximal end tooth portion 68. In this guide groove 75, a proximal end portion in the longitudinal direction thereof corresponding to the distance from the starting end position to the release starting position of the traveling range of the rack 65 is a parallel portion 75A formed parallel to the pitch line $P_L$, and a distal end portion in the longitudinal direction thereof corresponding to the distance from the release starting position to the terminal position is an inclined portion 75B which slopes away from the pitch line $P_L$.

The guide frame 66 is positioned at a predetermined position by a pair of positioning plates 47 on the side plate 14 and fixed with fixing screws 48. The plate portion 72 has a through hole (not shown) at a position corresponding to the insertion hole 67B in the distal end tooth portion 67. A distal end portion of a shear pin 76 made of resin is inserted into this insertion hole 67B via this through hole. This blocks movement of the distal end tooth portion 67 and the proximal end tooth portion 68 in the pitch line direction. In the guide frame 66 placed on the side plate 14, the guide pin 70 of the proximal end tooth portion 68 is inserted slidably into the guide groove 75 of the plate portion 72.

Next, the action and operation of the webbing winding device 10 of the first embodiment, in which the gear train mechanism and guide member having the above structure are employed will be described. When the piston driving apparatus 35 is actuated, high pressure gas is supplied to the piston cylinder 37 so that the piston 38 is slid in a direction for expanding the volume of the air chamber in the piston cylinder 37. As a result, the piston 38 moves the rod portion 69 of the rack 65 linearly along the pitch line $P_L$. At this time, a pressing force in the pitch line direction is transmitted to the tooth portions 67 and 68 of the rack 65 via the rod portion 69. After receiving this pressing force, the tooth portions 67 and 68 shear the shear pin 76 and begin to move. In the initial period of traveling, the direction of moment the proximal end tooth portion 68 and the distal end tooth portion 67 connected thereto are restricted by the parallel portion 75A of the guide groove 75 in the plate portion 72. From the starting end position to the release start position, the proximal end tooth portion 68 and the proximal end tooth portion 67 move along the pitch line $P_L$ with the teeth 67A, 68A meshing with the teeth 29A of the pinion 29. When the teeth 67A and 68A of the tooth portions 67 and 68 moving linearly due to the driving force from the driving apparatus 35 apply pressure to the teeth 29A, the pinion 29 converts the pressure from the tooth portion 40 into a rotation force. This rotation force shears the shear pin 39 which had been temporarily halting the rotor 23, so that the pinion 29 and rotor 23 begin to rotate in the retracting direction W.

At this time, the rotor 23 rotates in the retracting direction W relative to the holding plate 22. As a result, as shown in FIG. 6, each of the rollers 21 in the roller accommodating chambers 23B is moved from a position (OFF position) in which the roller 21 is stopped by the stopper protrusion 23C to an ON position in which each roller 21 is nipped by pressure from the outer peripheral face of the inner wheel portion 25 and the inner peripheral face of the roller accommodating chamber 23B, as shown in FIG. 7.

When the roller 21 is moved to the ON position, the rotor 23 is connected to the torque transmission shaft 20 in the rotation direction so that the one-way clutch 19 is placed in an ON state in which it is able to transmit torque from the pinion 29 to the spool 15. Consequently, the spool 15 is rotated at high speed in the retracting direction W integrally with the rotor 23 and pinion 29.

When the tooth portions 67 and 68 move up to the release start position together with the rod portion 41, the guide pin 70 of the proximal end tooth portion 68 enters from the parallel portion 75A of the guide groove 75 in the plate portion 72 into the inclined portion 75B. Consequently, the proximal end tooth portion 78 is inclined with respect to the pitch line $P_L$ and the direction of movement of the proximal end tooth portion 78 is restricted to a direction moving away from the pinion 29. Thus, the proximal end tooth portion 68 is advanced in the pitch line direction by a driving force from the piston driving apparatus 35 and moves away from the pinion in the radial direction with respect to the axis A with the pressure applying face 68C sliding relative to the pressure receiving face 67C of the distal end tooth portion 67 and, at the same time, with the pressure receiving face 68F sliding relative to the pressure applying face 69A of the rod portion 69. At t he same time, the engaging convex portion 68D of the proximal end tooth portion 68 is released from the engaging concave portion 67D of the distal end tooth portion 67. Further, the shear pin 71 is pulled out of the insertion hole 67E so that the connection between the tooth portions 67 and 68 is released. At this time, the teeth 68A of the proximal end tool portion 68 disengage from the teeth 29A of the pin ion 29 at a position just before the terminal position. When the operation of the piston driving apparatus 35 terminates, the proximal end tooth portion 68 is held at the terminal position away from the pinion 29, as shown in FIG. 7.

If, in the webbing winding device 10 of the first embodiment to which modification 2 of the gear train mechanism and guide member is applied, there is a play in the webbing 16 when the driving of the rack 51 by the piston driving apparatus 35 is completed, the rack 51 does not lock the rotations of the pinion 29 and the spool 15 and then the rotation of the spool 15 can be continued in the retracting direction W due to the inertial force until the play of the webbing 16 is removed completely.

(Second Embodiment)

Figure 8:
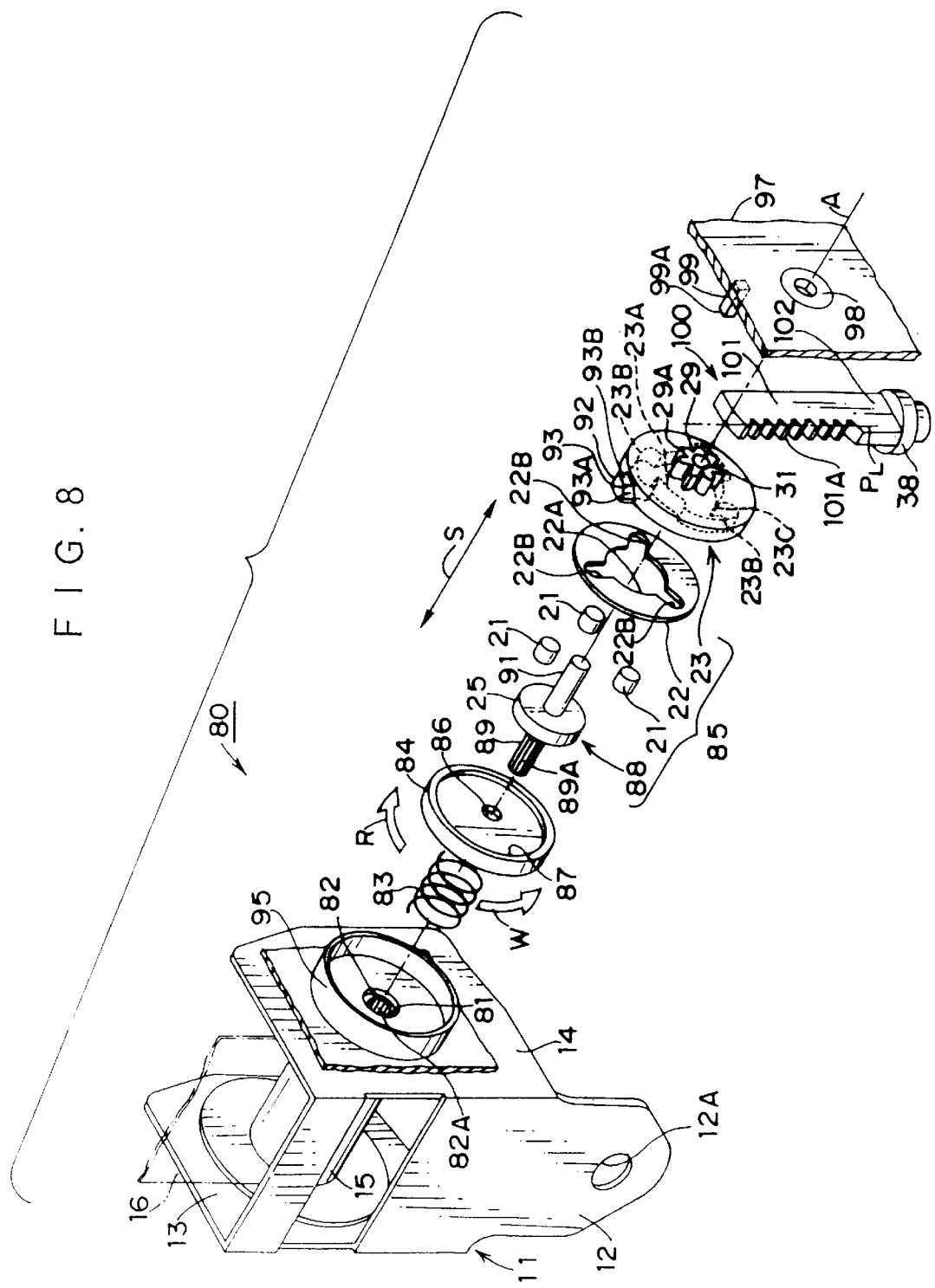
FIG. 8 is an exploded perspective view showing a structure of a torque transmission mechanism in the webbing winding device according to a second embodiment of the present invention.
Figure 9:
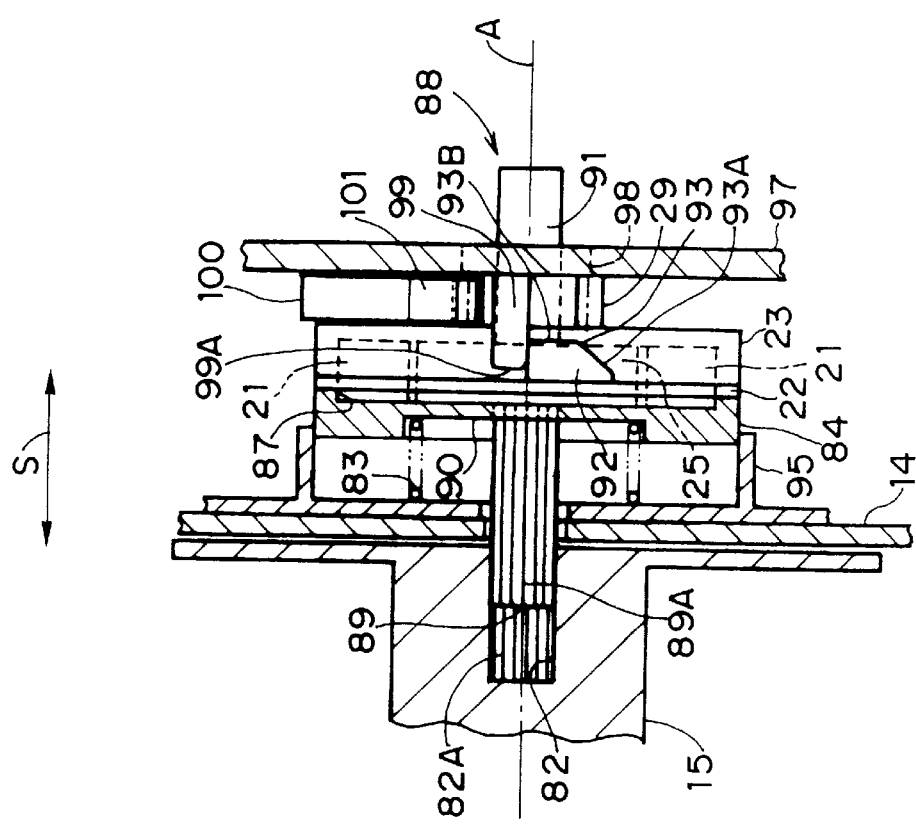
FIG. 9 is a side sectional view showing state in which a pinion and a rack are engaged prior to an actuation of the pre-tensioner of the webbing winding device according to the second embodiment of the present invention.
Figure 10:
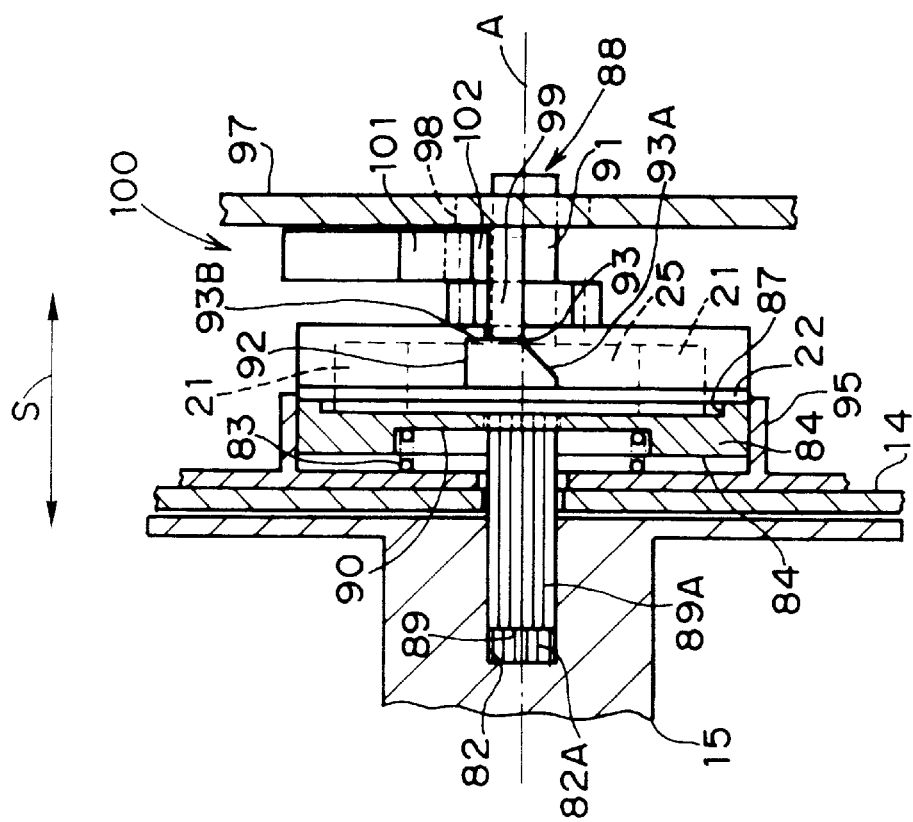
FIG. 10 is a side sectional view showing a state in which a pinion and a rack are separated after the actuation of the pre-tensioner of the webbing winding device according to the second embodiment of the present invention.

FIGS. 8–10 show a webbing winding device 80 according to a second embodiment of the present invention. In a description of the second embodiment, the same reference numerals are attached to components having basically the same structure and function as in the first embodiment and a description thereof is omitted. Moreover, components common to the webbing winding device 10 of the first embodiment will be described as required with reference to FIGS. 2 and 3.

A circular opening 81 is formed in one side plate 14 of the frame 11 around an axis A which is a rotation center of the spool 15. A circular concave engagement hole 82 is formed around the axis A in a side face of the spool 15 facing this circular opening 81.

A coil spring 83, a supporting circular plate 84 and a one-way clutch 85 are disposed on the outside of the side plate 14 of the frame 11 coaxially. The supporting circular plate 84 has a through hole 86 formed in the axial direction S in the center thereof and a guide rib 87 provided around the entire circumference thereof in the axial direction S such that it is bent outwards in the axial direction S. A circular concave portion 90 is formed around the axis A in an inner side face in the axial direction of the supporting circular plate 84 as shown in FIG. 9. An end of the coil spring 83 is inserted into this concave portion 90.

The one-way clutch 85 is mounted on the side plate 14 via the coil spring 83 and the supporting circular plate 84, as shown in FIG. 8. This one-way clutch 85 comprises a torque transmission shaft 88, cylindrical rollers 21, a holding plate 22 and a rotor 23. The torque transmission shaft 88 comprises a spline shaft portion 89, an inner wheel portion 25, and a supporting shaft portion 91, these portions each being formed in the form of a cylinder and having a different outside diameter. The spline shaft portion 89, the inner wheel portion 25 and the supporting shaft portion 91 are provided coaxially and integrally.

Spline teeth 89A extending along the axis A are formed on an outer peripheral face of the spline shaft portion 82 at a predetermined pitch in the circumferential direction. Spline grooves 82A having a shape corresponding to the shape of the spline teeth 89A of the spline shaft portion 24 are formed on an inner peripheral face of the engagement hole 89 at the same pitch as the spline teeth 89A. As a result, when the spline shaft portion 89 is inserted into the engagement hole 82 so that the spline teeth 89A engage the spline groove 82A, the torque transmission shaft 88 is supported so that it can move coaxially with the spool 15 and is connected to the spool 15 such that it can rotate integrally with the spool 15. The supporting shaft portion 91 of the torque transmission shaft 88 protrudes from an outer side face of the inner wheel portion 26 in the axial direction S.

The opening portion 22A of the holding plate 22 is placed on an outside peripheral face of the inner wheel portion 25 and then the holding plate 22 is placed on the supporting circular plate 84. The center axis of each of the three rollers 21 is parallel to the axis A. The three rollers 21 are placed inside the guide rib 87 of the supporting circular plate 84 passing through the roller holding portions 22B of the holding plate 22. As a result, the three rollers 21 are positioned at equal intervals in the circumferential direction by the roller holding portions 22B. If the holding plate 22 is rotated around the axis A, the rollers 22 slide on the supporting circular plate 84 in the circumferential direction with the equal interval maintained by the holding plate 22.

As shown in FIG. 8, the rotor 23 has a release driving cam 92 projecting in a radial direction thereof from an outer circumferential face thereof. This release driving cam 92 has a cam face 93 on outer side faces in the axial direction. The cam face 93 comprises a driving face 93A on the side of the retracting direction W and a holding face 93B on the side of a feed-out direction R relative to the driving face 93A. The driving face 93A is composed of a flat surface which slopes towards the spool 15 in the retracting direction W. The holding face 93B is composed of a flat surface orthogonal to the axial direction S. Here, it is assumed that the outside diameters of the supporting circular plate 84, the holding plate 22 and the rotor 23 are the same.

The pinion 29 provided integrally and coaxially with the rotor 23 has a center hole 31 along the axis A as shown in FIG. 8. The center hole 31 communicates with the inner wheel accommodating chamber 23A in the rotor 23. The rotor 23 is placed on the supporting circular plate 84 with the holding plate 22 sandwiched therebetween and accommodates the inner wheel portion 25 of the torque transmission shaft 88 coaxially within the inner wheel accommodating chamber 23A. At the same time, the rollers 21 are accommodated in the three roller accommodating chambers 23B. At this time, the supporting shaft portion 91 of the torque transmission shaft 88 passes through the center hole 31. The rotor 23 and the pinion 29 are supported by this supporting shaft portion 91 rotatably around the axis A and supported movably in the axial direction S.

A guide plate 95 which is curved cylindrically is provided on the side face 14 so as to surround an outside peripheral face of the supporting circular plate 84 placed on the side face of the spool 15, as shown in FIG. 8. An inner peripheral face of the guide plate 95 is curved at a curvature radius slightly larger than an outside peripheral face of the supporting circular plate 84 around the axis A.

The webbing winding device 80 has a casing partially formed from a plate 97 shown in FIG. 8. This casing is entirely formed in a box shape and accommodates the frame 11 supporting the spool 15, the one-way clutch 85, the piston driving apparatus 35 shown in FIG. 2 and the like. The plate 97 forming an end of the casing contains a ring-like bearing 98 embedded therein. The distal end portion of the supporting shaft portion 91 protruding from the center hole 31 of the pinion 29 is inserted through this bearing rotatably and slidably. The plate 97 is supported parallel to the side plate 14. A driving protrusion 99 is provided on an inner side face of the plate 97 such that it projects in the axial direction S. The driving protrusion 99 corresponds to the release driving cam 92 on the rotor 23. The distance from the axial line A to the driving protrusion 99 is substantially the same as the distance from the axial line A to the release driving cam 92. The distal end face of the driving protrusion 99 in the axial direction S is a sliding face 99A which slides against the cam face 93. This sliding face 99A is supported at substantially the same position in the axial direction as the driving face 93A of the cam face 93 before the piston driving unit 35 is actuated, as shown in FIG. 9.

The rotor 23 and the pinion 29 are always urged outward in the axial direction S by the coil spring 83 via the supporting circular plate 84. Before the piston driving apparatus 35 is actuated, as shown in FIG. 9, the pinion 29 is held at a position in which an outer side face thereof in the axial direction S is in pressure contact with an inner side face of the plate 97, and the supporting circular plate 84 is held such that an inner end thereof in the axial direction S is inserted slightly inside the guide plate 95. At this time, as shown in FIG. 9, a position of the rotor 23 in the rotation direction thereof is such that a side end face of the release driving cam 92 in the pay-out direction R is in contact with a side face of the driving protrusion in the retracting direction W, and the rotor 23 is temporarily halted in the rotation direction by a shear pin (not shown) as in the first embodiment.

The webbing winding device 80 having the above structure is mounted to a vehicle body in a condition in which the one-way clutch 85 is not transmitting any torque to the spool 15, that is, in an OFF state in which the spool 15 is separated from the pinion 29.

On the other hand, in the frame 11, as shown in FIG. 8, a rack 100 which meshes with the pinion 29 and the piston driving apparatus 35 connected to this rack 100 are disposed on an outer side face of the side plate 14.

The rack 100 is formed as an integrated member from a tooth portion 101 in which teeth 101A are formed on one side face in the transverse direction and a rod portion 102. In the rod portion 102, as shown in FIG. 8, a side end face of one side in the transverse direction thereof is extended beyond the pitch line $P_L$ of the teeth 101A toward the pinion 29. A proximal end face of the rod portion 102 is fixed to a piston 38. Before the piston driving apparatus 35 is actuated, as shown in FIG. 9, the rack 100 is sandwiched between the rotor 23 and the plate 97 of the casing so that movement thereof in the axial direction S is restricted.

Next, the action and operation of the webbing winding device 10 according to the present embodiment having the above structure will be described. When the piston driving apparatus 35 shown in FIG. 2 is actuated and high pressure gas is supplied to the piston cylinder 37, the piston 38 slides in a direction for expanding the volume of the air chamber in the piston cylinder 37. Then, the rack 100 moves along the pitch line $P_L$ with the teeth 101A of the tooth portion 101 meshing with the teeth 29A of the pinion 29 so as to rotate the pinion 29 and rotor 23 in the retracting direction W. At this time, when the rotor 23 rotates in the retracting direction W relative to the holding plate 22, each of the rollers 21 in the roller accommodating chambers 23B is moved from a position (OFF position) in which the roller 21 is stopped by the stopper protrusion 23C to a position (ON position) in which the roller 21 is nipped by the pressure from the outer peripheral face of the inner wheel portion 25 and the inner peripheral face of the roller accommodating chamber 23B. As a result, the one-way clutch 85 is placed in an ON state in which it is capable of transmitting torque from the pinion 29 to the spool 15. Consequently, the spool 15 is rotated in the retracting direction W integrally with the rotor 23 and pinion 29.

When the rotor 23 rotates in the retracting direction by about one turn, the rotor 23 brings the driving face 93A of the release driving cam 92 into contact with the sliding face 99A of the driving protrusion 99 and continues to rotate in the retracting direction with the driving face 92A sliding on the sliding face 99A of the driving protrusion 99. As a result, a part of the rotation force from the pinion 29 is converted to a component of force (thrust force) in a direction which is parallel to the axis A and moving away from the plate 97A. This thrust force moves the supporting circular plate 84, rotor 23 and pinion 29 supported movably in the axial direction 5, towards the spool 15 while resisting an urging force of the coil spring 83. At this time, the supporting circular plate 84 moves in the axial direction S a long the inner peripheral face o f the guide plate 95 while compressing the coil spring 83.

If the rotor 23 rotates in the retracting direction W to where the sliding face 99A of the driving protrusion 99 comes into contact with the holding face 93B of the cam face 93, the pinion 29 is moved in the axial direction S to where the teeth 29A thereof disengage from the teeth 101A of the rack 100. When the sliding face 99A of the driving protrusion 99 is in contact with the holding face 93B of the cam face 93, the piston driving apparatus 35 moves the rod portion 102 of the rack 100 over an outer side face in the axial direction S of the pinion 29. As a result, even after the sliding face 99A of the driving protrusion 99 is released from the holding face 93B of the cam face 93, the pinion 29 is held by a side face of the rod portion 102 at a position where it does not mesh with the teeth 101A of the rack 100, as shown in FIG. 10, and is also capable of rotating in the retracting direction W without being restricted by the rack 100.

In the webbing winding device 80 of this embodiment, if the piston driving apparatus 35 is actuated so that the one-way clutch 85 is placed in the ON state, the rack 100 which is a driving gear is driven and the torque in the retracting direction W is transmitted from the pinion 29 which constitutes the gear train mechanism together with this rack 100 to the spool 15. If there is play in the webbing 16 worn by a passenger, the spool 15 is rotated rapidly in the retracting direction W by the torque transmitted from the pinion 29, so that the webbing 16 is retracted by the spool 15.

On the other hand, when the driving of the rack 100 is completed, the pinion 29 is moved in the axial direction S and held by the rod portion 102 at a position away from the rack 100. At this time, an inertial force based on the masses of the rotor 23, pinion 29 and the like rotating integrally with the spool 15 as well as an inertial force based on the mass of the spool 15 is applied to the spool 15 as a rotation force in the retracting direction W. Thus, if there is still play in the webbing 16 fitting to a passenger when the driving of the rack 34 is completed, because the tension of the webbing 16 acting on the spool 15 as a rotation load is small and a large inertial force acts on the spool 15 rotating at high speed, the spool 15 continues its rotation in the retracting direction W. Then, if a tension balancing the inertial force of the spool 15 is generated in the webbing 16, the rotation of the spool 15 is stopped. Therefore, even if the play in the webbing 16 is large just before the piston driving apparatus 35 is actuated, the rack 100 does not block the rotations of the pinion 29 and the spool 15 and the rotation of the spool 15 can be continued in the retracting direction W until the play in the webbing 16 is removed completely.

(Third Embodiment)

Figure 11:
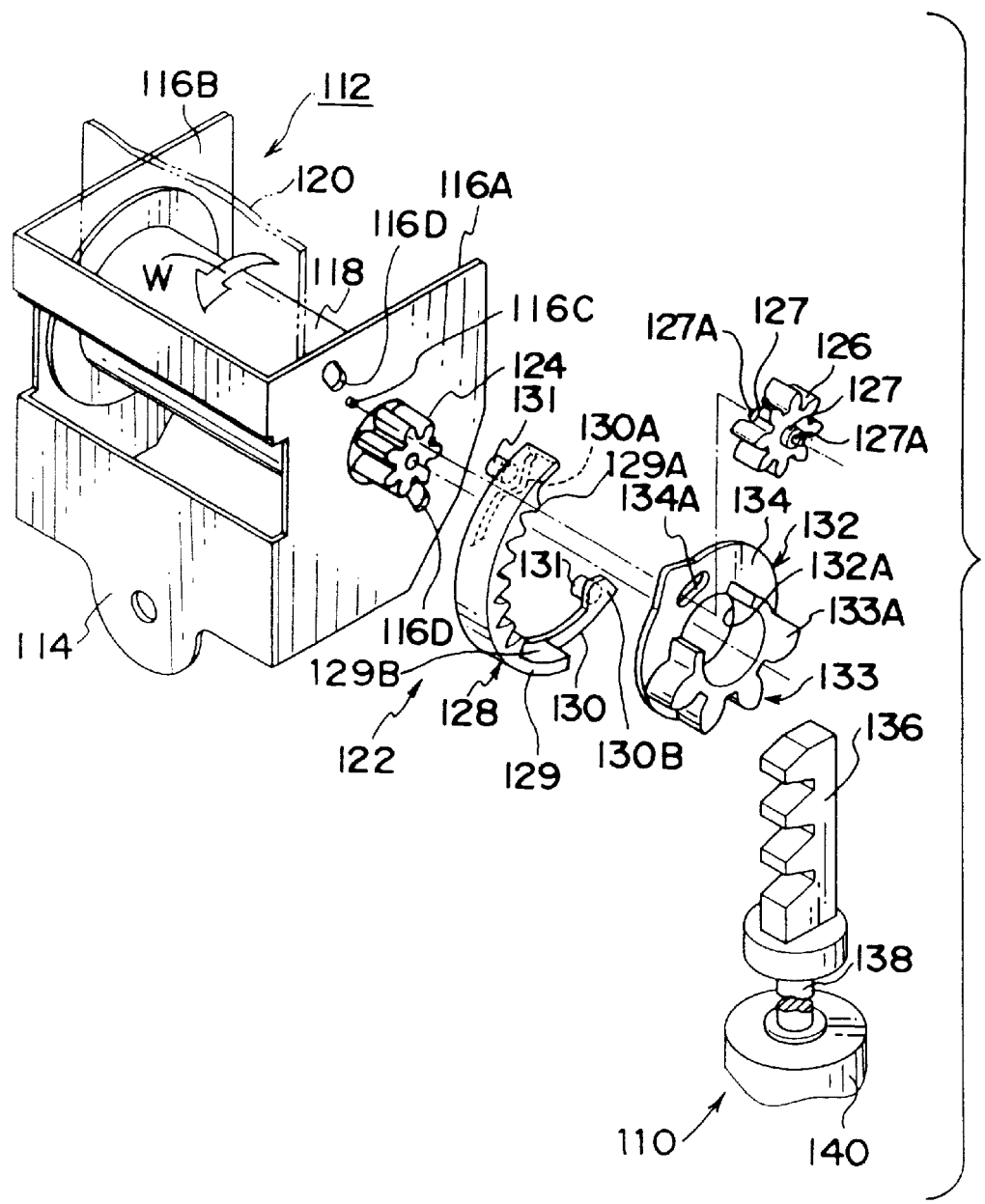
FIG. 11 is an exploded perspective view showing a structure of a webbing winding device according to a third embodiment of the present invention.

FIG. 11 shows a webbing winding device 112 according to a third embodiment of the present invention. This webbing winding device 112 comprises a plate 114 to be fixed to a vehicle body and a pair of side plates 116A and 116B which are bent from both sides of the plate 114 at right angles and parallel to each other. The side plates 116A and 116B rotatably support a spool 118. The distal end of the webbing to be fitted to a passenger is anchored to this spool 118 and the webbing 120 is wound around the spool 118 in layers.

A clutch 122 is disposed outside one side plate 116A at an end of the spool 118. This clutch 122 comprises a sun gear 124 projecting outward from one side plate 116A, a planet gear 126 which is always meshing with this sun gear 124, a slider gear 128 disposed so as to be able to mesh with the planet gear 126 and a cam gear 132 disposed so as to be able to mesh with the slider gear 128.

The sun gear 124 is disposed coaxially with the spool 118 and rotates integrally with the spool 118. The cam gear 132 is comprised of a semi-circular pinion 133 and a thin ring-shaped plate 134 and this plate 134 is disposed on the side of one side plate 116A. A circular opening 132A is formed around the axis of the cam gear 132. The sun gear 124 is inserted into this circular opening 132A. That is, the sun gear 124 is located inside the pinion 133 and meshes with the planet gear 126 located on an opposite face of the plate 134 to the side plate 116A.

A starting end gear 133A of the pinion 133 is disposed so as to be in contact with a rack 136 connected to a piston 140 of the piston driving apparatus (not shown) via a connecting rod 138. The piston 140 is accommodated movably in a piston cylinder (not shown). Note that, a driving member for rotating the cam gear 132 is not restricted to the rack 136, and, for example, a driving gear such as a fan-shaped gear (sector gear) having no teeth over the entire periphery thereof may be used.

Figure 12:
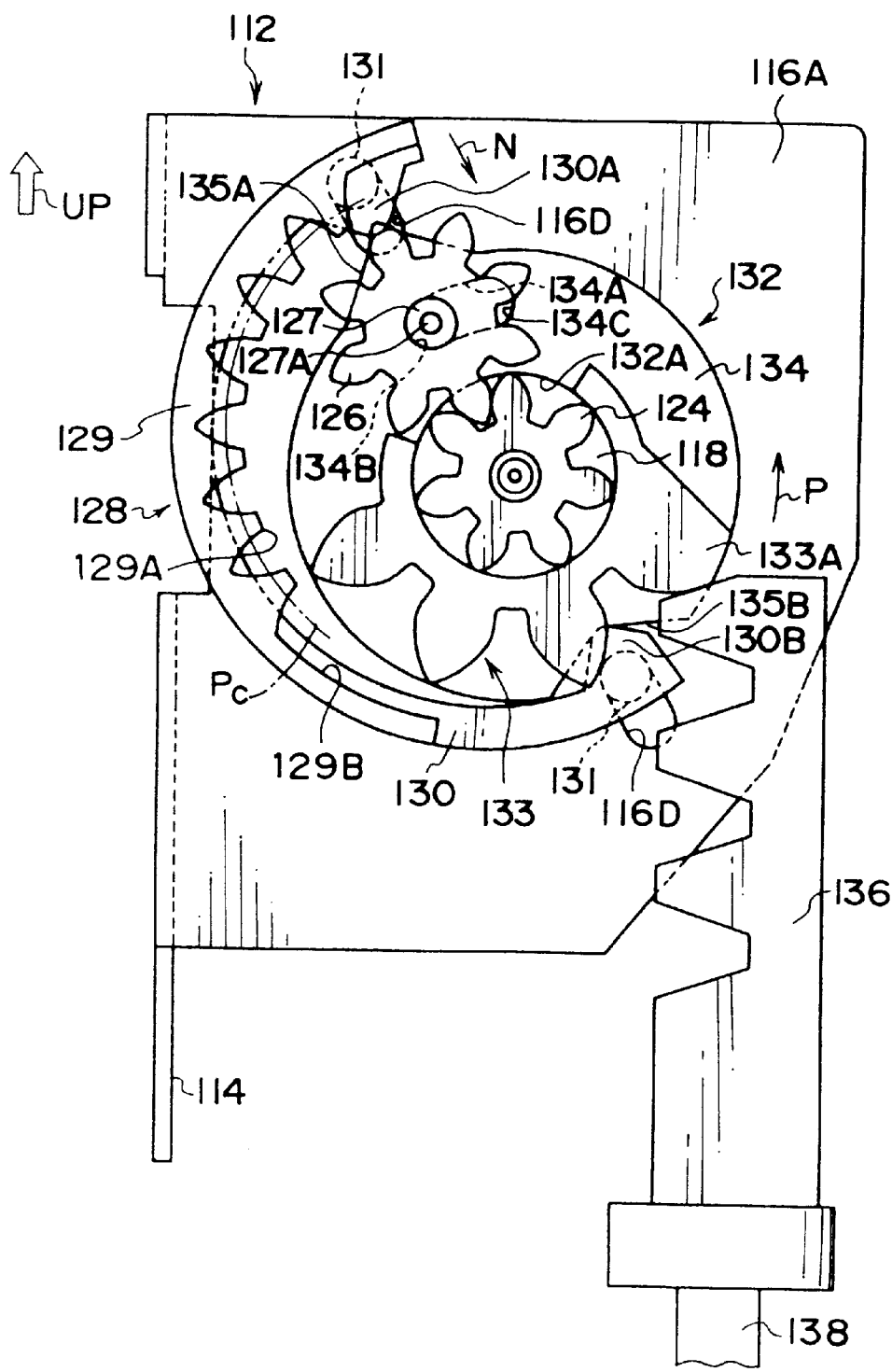
FIG. 12 is an axial plan view showing a state prior to an actuation of the pre-tensioner of the webbing winding device according to the third embodiment of the present invention.

As shown in FIG. 12, an elongated hole 134A is formed in a portion of the plate 134 of the cam gear 132. The elongated hole 134A is disposed so that the longitudinal direction thereof is formed in an arc shape centered around the axis of the cam gear 132. This is used for positioning the planet gear 126 so that the teeth of the slider gear 128 can be lined up with the teeth of the planet gear 126 and engaged therewith when the slider gear 128 moves in a direction orthogonal to the axis of the sun gear 124.

In the plate 134, a triangular engaging protrusion 135A forming a part of the cam portion is provided so as to protrude outward at a position corresponding to the elongated hole 134A. Moreover in the plate 134, a triangular engaging cutout portion 135B forming a part of the cam portion is formed at a position opposite the engaging protrusion 135A across the center of the cam gear 132.

As shown in FIG. 11, the planet gear 126 is disposed rotatably above the cam gear 132. A supporting shaft 127 protrudes from the axis of each of both side faces of the planet gear 126 and a small-diameter pin 127A also protrudes from each of the supporting shafts 127. One end of the supporting shaft 127 is inserted into the elongated hole 134A and the other end of the supporting shaft 127 is inserted into an elongated hole (not shown) formed in the same way as the elongated hole 134 in a cover (not shown).

In one side plate 116A corresponding to the pin 127A and the cover (not shown) are punched coaxial holes 116C. The pin 127A is inserted into these holes 116C so that the planet gear 126 is rotatable. That is, the planet gear 126 is journaled rotatably at a predetermined position of the side plate 116A. If a predetermined load is applied to the pin 127A, the pin 127A is sheared and the planet gear 126 rotates along the slider gear 128. That is, the sun gear 124, the planet gear 126 and the slider gear 128 form a planet gear mechanism in which the planet gear 126 is rotated around its own axis in a clockwise direction by the slider gear 128 at the same time as it is being rotated counterclockwise around the axis A of the sun gear 124.

Figure 14:
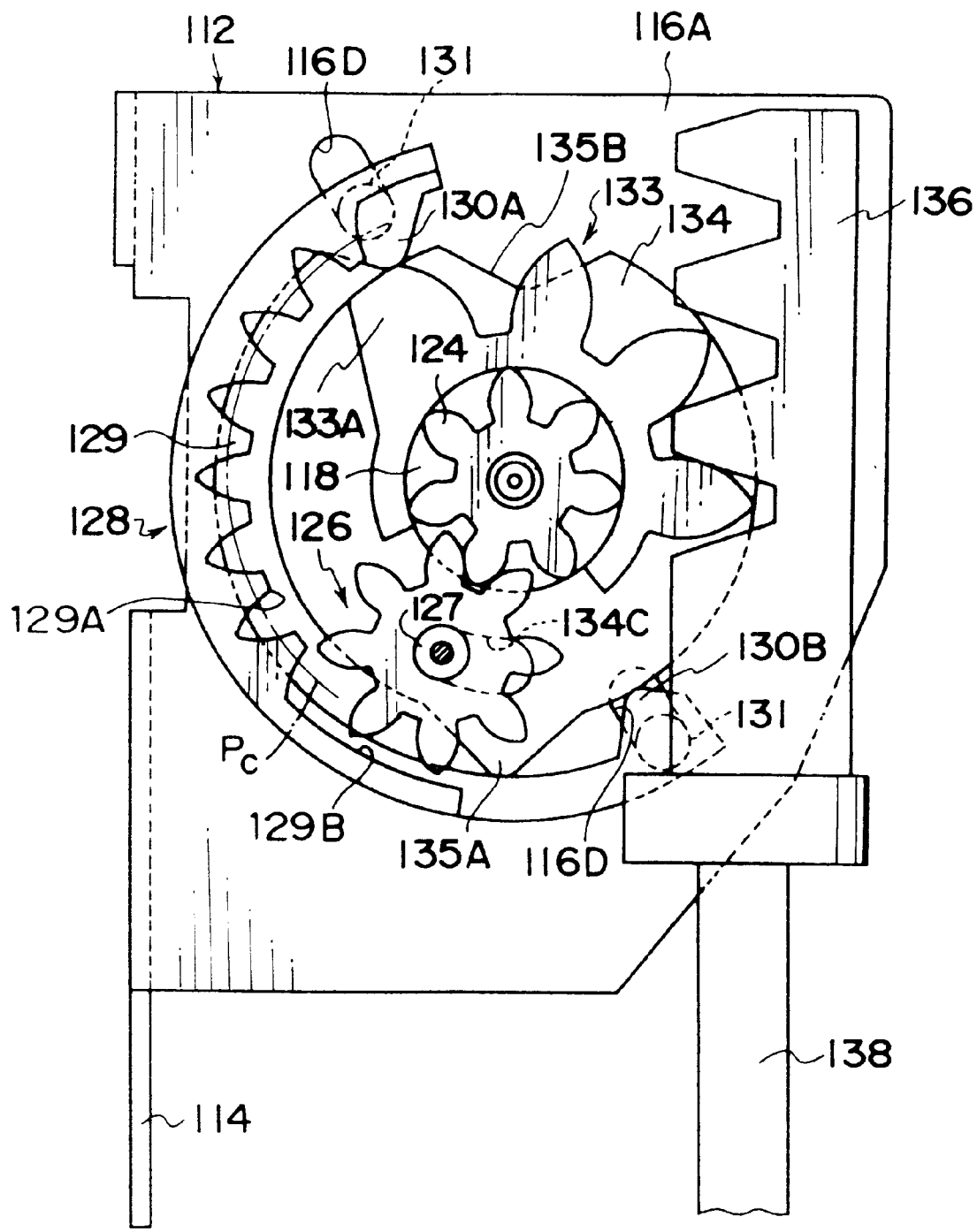
FIG. 14 is an axial plan view showing a state in which a planet gear and an internal gear are separated immediately after an actuation of the pre-tensioner of the webbing winding device according to the third embodiment of the present invention.

As shown in FIG. 11, the slider gear 128 is an integral member comprising a substantially semi-circular internal tooth type internal gear 129 and a thin plate-like cam 130. This internal gear 129 is as long in a pitch circle direction along the pitch circle $P_C$ around the axis A of the spool 118, as a traveling distance of the rack 136 moving linearly from a starting end position shown in FIG. 11 to a terminal position shown in FIG. 14 when the piston driving apparatus is actuated. Although, in the internal gear 129, teeth 129A are formed continuously on an inner peripheral face thereof along a pitch circle $P_C$, no tooth 129A is provided at a portion corresponding to the terminal position of the rack 136 on the inner peripheral face of the internal gear 129. Instead, a toothless portion 129B is formed which comprises a curved face running along the deddendum circle of the teeth 129A. Thus, if the rack 136 is moved to the terminal position, as shown in FIG. 14, a gap is formed between the tips of the teeth of the planet gear 126 and the toothless portion 129B of the internal gear 129, so that the planet gear 126 is disengaged from the internal gear 129. Thus, the planet gear 126 and the sun gear 118 which meshes with the planet gear 126 are capable of rotating without being restricted by the internal gear fixed to the side plate 116A. Therefore, the spool 118 connected to the sun gear 124 is capable of rotating in the retracting direction W.

The cam 130 is disposed on the side of one side plate 116A and pins 131 which protrudes towards the side plate 116A are provided on each of both ends of the cam 130. An elongated hole 116D is formed at a position corresponding to each of these pins 131 in the side plate 116A. These elongated holes 116D are disposed such that the longitudinal directions thereof are orthogonal to the axis of the sun gear 124, i.e. the longitudinal directions thereof match a radial direction of the sun gear 24. Further, triangle shaped protrusions 130A and 130B are formed at positions corresponding to the pins 131 of the cam 130 as engaging portions. These protrusions 130A and 130B protrude toward the axis of the sun gear 124.

The sun gear 124 and the cam gear 132 are disposed such that a vertex of the protrusion 130A faces and is in contact with a vertex of the engaging protrusion 135A, and a vertex of the protrusion 130B faces and is in contact with a valley portion of the engaging cutout portion 135B. As shown in FIG. 12, the supporting shaft 127 of the planet gear 126 is located at an end 134B of the elongated hole 134A in the cam gear 132. In this initial state, the pin 131 of the slider gear 128 is located on an upper side (direction indicated by the arrow UP in FIG. 12) of the side plate 116A so that the planet gear 126 does not mesh with the slider gear 128. Thus, the slider gear does not obstruct the rotations of the planet gear 126 and the spool 118 so that the webbing 120 can be retracted or fed out freely. That is, at this initial position, the vertex of the protrusion 130A of the sun gear 124 opposes the vertex of the engaging protrusion 135A of the cam gear 132 and the vertex of the protrusion 130B opposes the vertex of the engaging cutout portion 135B.

Figure 13:
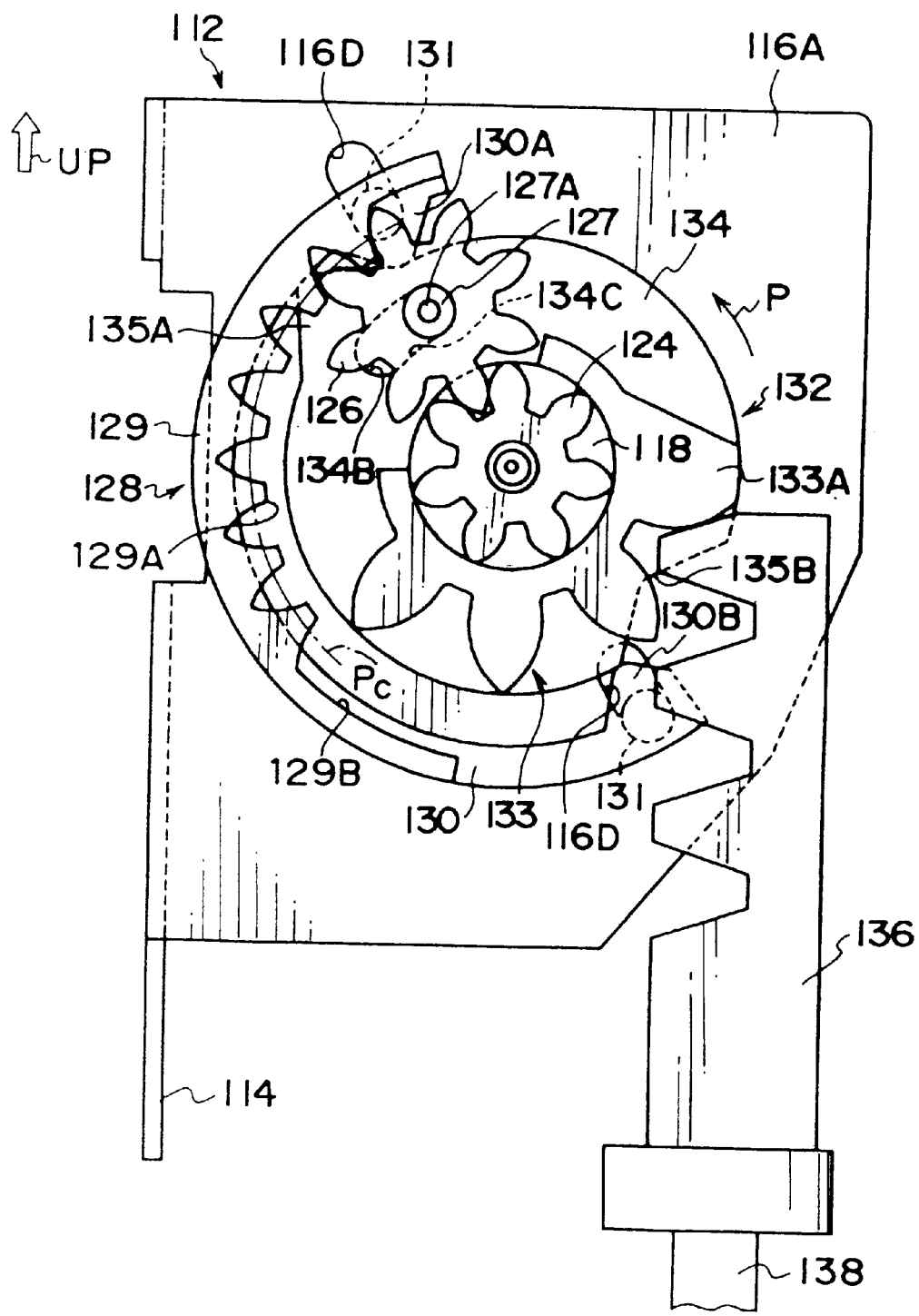
FIG. 13 is an axial plan view showing a state which a planet gear and an internal gear are engaged immediately after an actuation of the pre-tensioner of the webbing winding device according to the third embodiment of the present invention.

On the other hand, if the engagements between the engaging protrusion 135A and the protrusion 130A and between the engaging cutout portion 135B and the protrusion 130B are released and the pins 131 of the slider gear 128 drops down to the right along the elongated hole 116D as shown in FIG. 13, the planet gear 126 meshes with the internal gear 129 of the slider gear 128. That is, the gear mechanism of this embodiment is a planet gear mechanism comprising a sun gear 124, a planet gear 126, a slider gear 128 and a cam gear 132.

In the initial state shown in FIG. 12, the starting end gear 133 of the pinion 133 of the cam gear 132 is kept in contact with the rack 136. With the movement of the piston 140, the rack 136 moves upward rotating the cam gear 132.

The piston driving apparatus includes a gas generator (not shown), which ignites in an emergency deceleration of a vehicle to generate a large amount of gas. This gas generator communicates with a space behind the piston 140 in a piston cylinder (not shown). Thus, if the gas generator ignites to generate a large amount of gas, this large amount of gas is supplied to the backside of the piston 140 in the cylinder.

The other end portion of the spool 118 extends out of the other side plate 116B to reach an emergency deceleration locking mechanism (not shown). This locking mechanism is identical to a conventionally known locking mechanism for stopping the feed-out rotation of the spool 118 in response to an emergency deceleration of the vehicle or an acceleration in the feeding out of the webbing 120. Thus, a description thereof in detail is omitted.

Next, the action and operation of the webbing winding device 112 of this embodiment having the above structure will be described.

First, an action of the webbing winding device 112 of the present embodiment when the pre-tensioner is actuated will be described. When the vehicle is traveling normally, as shown in FIG. 12, the clutch 122 is maintained in its initial state, namely, the vertex of the protrusion 130A the slider gear 128 opposes the vertex of the engaging protrusion 135A of the cam gear 132 and the vertex of the protrusion 130B opposes the vertex of the engaging cutout portion 135B. Thus, the planet gear 126 is held away from the slider gear 128 (internal gear 129). Therefore, a rotation of the spool 118 is not obstructed by the slider gear 128 so that the spool 118 is capable of rotating freely while rotating the planet gear so as to achieve retracting and feed-out of the webbing.

If the vehicle decelerates in an emergency, the piston driving apparatus (not shown) is actuated, so that a high pressure gas flows to the back face of the piston 140 in the piston cylinder. As a result, the piston 140 disposed in the cylinder moves the rack upwards in a straight line from the starting end position (the direction shown by the arrow UP in FIG. 12). As a result, the rack 136 presses the starting end gear portion 133 with which it is in contact in the initial state upward, thereby rotating the cam gear 132 counterclockwise (the direction indicated by the arrow F) shown in FIG. 12. When the cam gear 132 is rotated, the web winding device is no longer in the initial state shown in FIG. 12, but has entered the ON state shown in FIG. 13.

That is, the protrusion 130A moves away from the engaging protrusion 135A and the cam 130B moves away from the engaging cutout portion 135B. At the same time, the lower pin 131 receives a downward pressing force from the inclined face of the engaging cutout portion 135B and is guided along the elongated hole 116D so that the slider gear 128 slides in the direction of the indicated by the arrow N in FIG. 12. As the slider gear 128 slides, as shown in FIG. 13, the teeth of the internal gear 129 of the slider gear 128 fit between and mesh with the teeth of the planet gear 126. Thus, because according to this embodiment, the slider gear 128 slides along the elongated hole 116D, the teeth of the internal gear 129 of the slider gear 128 engage the teeth of the planet gear 126 smoothly. Note that after the slider gear 128 engages the planet gear 126, the planet gear 126 revolves around.

As shown in FIG. 13, if the cam gear 132 rotates counterclockwise, the pin 127A of the planet gear 126 is moved relatively from one end 134B to the other end 134C of the elongated hole 134A relatively and comes into contact with the other end 134C. If the rack 136 is moved further upward from this state, the cam gear 132 is rotated counterclockwise. Then, if the rotation force exceeds a predetermined value, the pin 127A of the planet gear 126 is sheared. Thus, the planet gear 126 revolves as around the cam gear 132 rotates, with the pin 127A in contact with the other end 134C of the elongated hole 134A.

That is, when the cam gear 132 is rotated counterclockwise from the state shown in FIG. 13, the planet gear 126 revolves around counterclockwise while it is itself rotated clockwise by the internal gear 129 of the slider gear 128. Therefore, the sun gear 124 meshing with the planet gear 126 rotates counterclockwise. Because of this, the spool 118 is forced to rotate at high speed in the retracting direction (see FIG. 11) along with the rotation of the sun gear 124. As a result, the webbing 120 is wound around the spool 118 rapidly.

When the rack 126 is moved up to the terminal end, as shown in FIG. 14, so that the rotation of the cam gear 132 stops, the planet gear 126 is released from the internal gear 129 due to the tooth missing portion 129B, enabling that the sun gear 124 and the spool 118 to be rotated in the retracting direction W.

In the webbing winding device 112 according to this embodiment described above, when the piston driving unit is actuated, the rotation of the cam gear 132 is accelerated and transmitted to the sun gear 124. Thus, when the piston 140 is moved in the piston cylinder by gas pressure when there is play in the webbing 120 fitted around a passenger, the spool 118 is rotated at high speed in the retracting direction W by the torque transmitted from the sun gear 124 to the spool 118 resulting in the webbing 120 being wound around the spool 118. If the play in the webbing 120 is slight at this time, the pre-tensioner rotates the spool 118 in the retracting direction until the play in the webbing 120 is removed. When a tension balancing the gas pressure in the piston cylinder is generated, then, even if the piston 140 has traveled partway to the terminal end on its traveling stroke, the piston 140 is halted. On the other hand, because the planet gear 126 is released from the internal gear 129 when the driving of the rack 136 by the piston driving apparatus is completed, if there is play left in the webbing 120, the tension of the webbing 120 acting as a rotation load on the spool 118 is small and a large inertial force acts on the spool 118 rotating at high speed. Thus, the spool 118 continues to be rotated in the retracting direction by its inertial force. If a tension balancing the inertial force on the spool 118 is generated, the rotation of the spool stops. Therefore, even if the play in the webbing 120 is large just before the piston driving apparatus is actuated, the spool may be rotated in the retracting direction until the play in the webbing 120 is removed completely.

(Modification 1 of the Third Embodiment)

Figure 15:
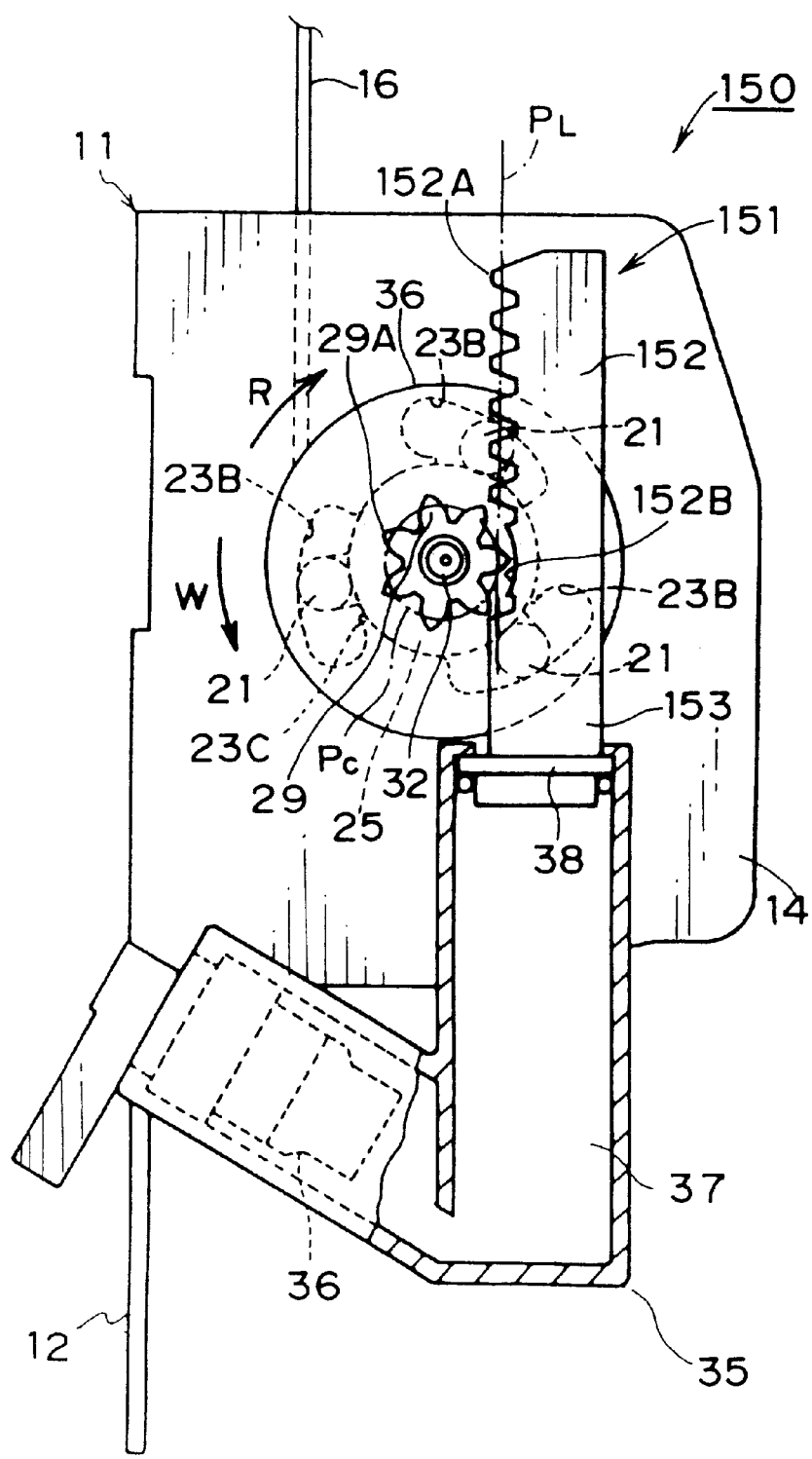
FIG. 15 is an axial plan view showing a state after an actuation of the pre-tensioner of the webbing winding device to which a modification 1 of the gear train mechanism of the third embodiment of the present invention is applied.

Modification 1 of the gear train mechanism according to the third embodiment of the present invention will be described with reference to FIG. 15. The webbing winding device 150 shown in FIG. 15 includes a gear train mechanism comprised of a rack 151 and a pinion 29. The same reference numerals are attached to components having basically the same structure and function as the webbing winding device 10 of the first embodiment, and a description thereof is omitted.

The rack 151 has a structure in which a tooth portion 152 and a rod portion 153 are integrated. This tooth portion 152 is substantially as long in the pitch line direction as a traveling distance of the rack 151 when it is moved from its starting end position to its terminal end position by the piston driving apparatus 35.

In the tooth portion 152, teeth 152A which mesh with teeth 29A of the pinion 29 are formed continuously on a side end face in the transverse direction. A toothless portion 152B, which has a slightly larger diameter than the circle formed by the tips of the teeth of the pinion 29 when the rack 151 is stopped at the terminal end position and is made of a concave curved face which curves in a circular arc form around the axis A, is formed at a position of the proximal end corresponding to the terminal end position on one side end face of the tooth portion 152. As a result, if the rack 151 moves up to the terminal end position, as shown in FIG. 15, a gap is generated between the tooth tip of the pinion 29 and the toothless portion 152B of the rack 151, 50 that the pinion 29 moves away from the rack 151. Therefore, the spool 15 connected to the pinion 29 is capable of rotating in the retracting direction without being restricted by the rack 151.

The action of this webbing winding device when the piston driving apparatus 35 is actuated is basically the same as that of the webbing winding device of the first embodiment and a description thereof is omitted. In the webbing winding device 150 to which modification 1 of the gear train mechanism is applied also, if there is play in the webbing 16 when the driving of the rack 151 by the piston driving apparatus 35 is completed, the rack 151 does not restrict the rotations of the pinion 29 and spool 15 but the spool 15 is able to rotate in the retracting direction W due to its inertial force until the play in the webbing 16 is removed completely.

(Fourth Embodiment)

FIGS. 16–20 show a webbing winding device 160 according to the fourth embodiment of the present invention. The same reference numerals are attached to components having basically the same structure and function as in the third embodiment and a description thereof is omitted. The webbing winding device 160 of this embodiment comprises a well known planetary gear mechanism 161 and one-way clutch 162 as a torque transmission mechanism for transmitting torque to the spool 118.

Figure 17:
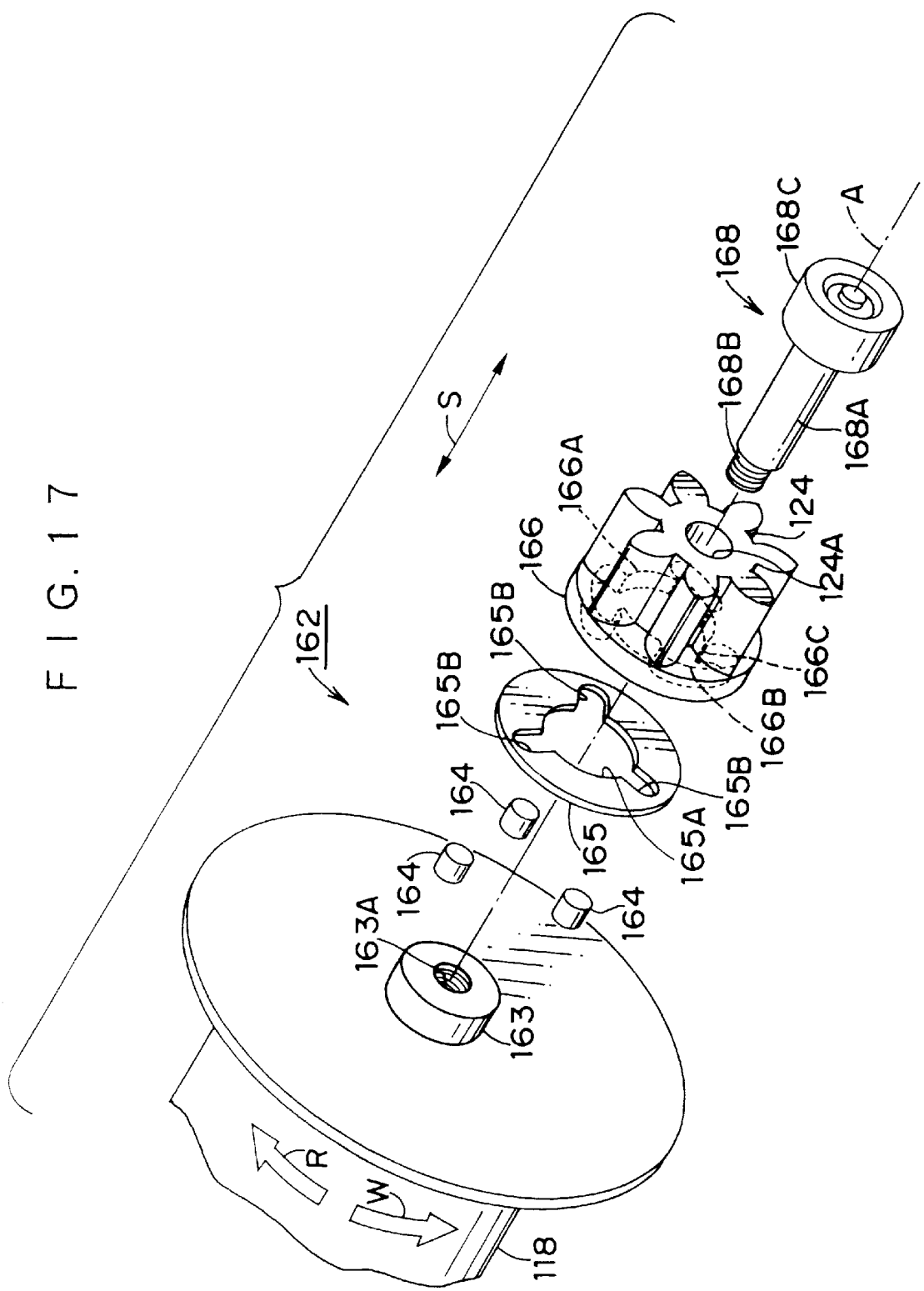
FIG. 17 is an exploded perspective view showing a structure of a one-way clutch in the webbing winding apparatus according to the fourth embodiment of the present invention.

In the webbing winding device 160, a sun gear 124 is connected to a spool 118 which is a winding shaft via the one-way clutch 162. This one-way clutch 162, as shown in FIG. 17, comprises an inner wheel portion 162 provided integrally with the spool 118, three cylindrical rollers 164, a thin circular holding plate 165 and a rotor 166 provided integrally with the sun gear 124.

The inner wheel portion 163 is provided so as to protrude from a side face of the spool 118 and is formed in a circular convex form around the axis A of the spool 118. Circular opening (not shown) slightly larger than an outside diameter of the holding plate 165 is formed centering on the axis A in the side plate 116A of the plate 114. The inner wheel portion 163 of the spool 118 supported by the side plates 116A and 116B protrudes outside the side plate 116A via the circular opening in the side plate 116A.

The holding plate 165 is formed in a thin circular plate and the outside diameter thereof is substantially the same as the outside diameter of the rotor 166. An opening portion 165A whose diameter is slightly larger than the outside diameter of the inner wheel portion 163 is formed in the center of the holding plate 165. Three roller holding portions 165B are formed by cutting U-shaped portions from the inner periphery face of the opening portion 165A in a radial direction. The roller holding portions 165B are formed slightly wider than the diameter of the rollers 164. These roller holding portions are provided at equal intervals (120°) in a circumferential direction around the axis A.

The opening portion 165A of the holding plate 165 is placed on an outside peripheral face of the inner wheel portion 163 and then the holding plate 165 is placed on a side face of the spool 118 via a circular opening of the side plate 116A. As a result, the holding plate 165 is held in a ring-like concave portion formed by the outside peripheral face of the inner wheel portion 163 and the inside peripheral face of the circular opening in the radial direction and is positioned coaxially with the spool 15.

The center axis of each of the three rollers 164 is parallel to the axis A. The three rollers 164 are placed on a side face of the spool 118 via each of the roller holding portions 165B in the holding plate 165. As a result, the three rollers 164 are positioned at equal intervals in the circumferential direction by the roller holding portions 165B. If the holding plate 165 is rotated around the axis A, they slide on the side face of the spool 118 in the circumferential direction with the equal intervals maintained by the holding plate 165.

A rotor 166 is configured as an outside wheel of the one-way clutch 162 and formed in a circular shape having a large thickness, as shown in FIG. 17. An inner wheel accommodating chamber 166A and three roller accommodating chambers 166B communicating with this inner wheel accommodating chamber 166A are formed in this rotor 166. The inner wheel accommodating chamber 166A forms a cylindrical space corresponding to the inner wheel portion 163 inside the rotor 166 and each of the roller accommodating chambers 166B forms a space extending outward from the inner peripheral face of the inner wheel accommodating chamber 166A. These spaces are provided at equal intervals (120°) in the circumferential direction around the axis A. Each of the roller accommodating chambers 166B is formed in a substantially elliptic shape extending in a spiral direction around the axis A. Partition wall-like stopper protrusions 166C are formed along an inner peripheral face of the inner wheel accommodating chamber 166A between an outside end of each roller accommodating chamber 166B in the spiral direction and the inner wheel accommodating chamber 166A. Each roller accommodating chamber 166B forms a substantially wedge-like space which narrows in width gradually toward the inside in the spiral direction between the roller accommodating chamber and an outside peripheral face of the inner wheel portion 163 accommodated in the inner wheel accommodating chamber 166A. The rotor 23 has a sun gear 124 provided integrally and coaxially therewith on an outside side face in the axial direction S, as shown in FIG. 17. A center hole 124A is made through this sun gear 124 and the center hole 124A communicates with the inner wheel accommodating chamber 166A in the rotor 166.

The rotor 166 is placed on the side face of the spool 118 with the holding plate 165 sandwiched and accommodates the inner wheel portion 163 within the inner wheel accommodating chamber 166A. At the same time, the rollers 164 are accommodated in the three roller accommodating chambers 166B. If the rotor 166 and the sun gear 124 are placed on the side face of the spool 118, a connecting member 168 is inserted into the center hole 124A in the sun gear 124. The connecting member 168 is comprised of a round bar-like shaft portion 168A, a male threaded portion 168B provided at a front end of this shaft portion 168A, and a head portion 168C supported at a rear end of the shaft portion 168A coaxially therewith as shown in FIG. 17. In the connecting member 168, the shaft portion 168A is inserted through the center hole 124A in the sun gear 124 and the inner wheel accommodating chamber 166A in the rotor 166. The male threaded portion 168B is screwed into the threaded hole 163A in the inner wheel portion 163. As a result, the sun gear 124 and the rotor 166 are supported rotatably coaxially with the spool 118.

The one-way clutch 162 is mounted to a vehicle in an OFF state in which the spool 118 is separated from the sun gear 124. This OFF state is basically the same as the OFF state of the one-way clutch 19, and therefore a description thereof is omitted. When the one-way clutch 162 is in the OFF state, even if the sun gear 124 is blocked from rotation, the spool 118 may be rotated both in the retracting direction and feed-out direction of the webbing 120. If torque is transmitted to the sun gear 124 in the retracting direction W and the rotor 166 rotates in the retracting direction W with respect to the holding plate 165, the one-way clutch 162 changes from an the OFF state to an ON state, so that the torque can be transmitted from the sun gear 124 to the spool 118.

Figure 16:
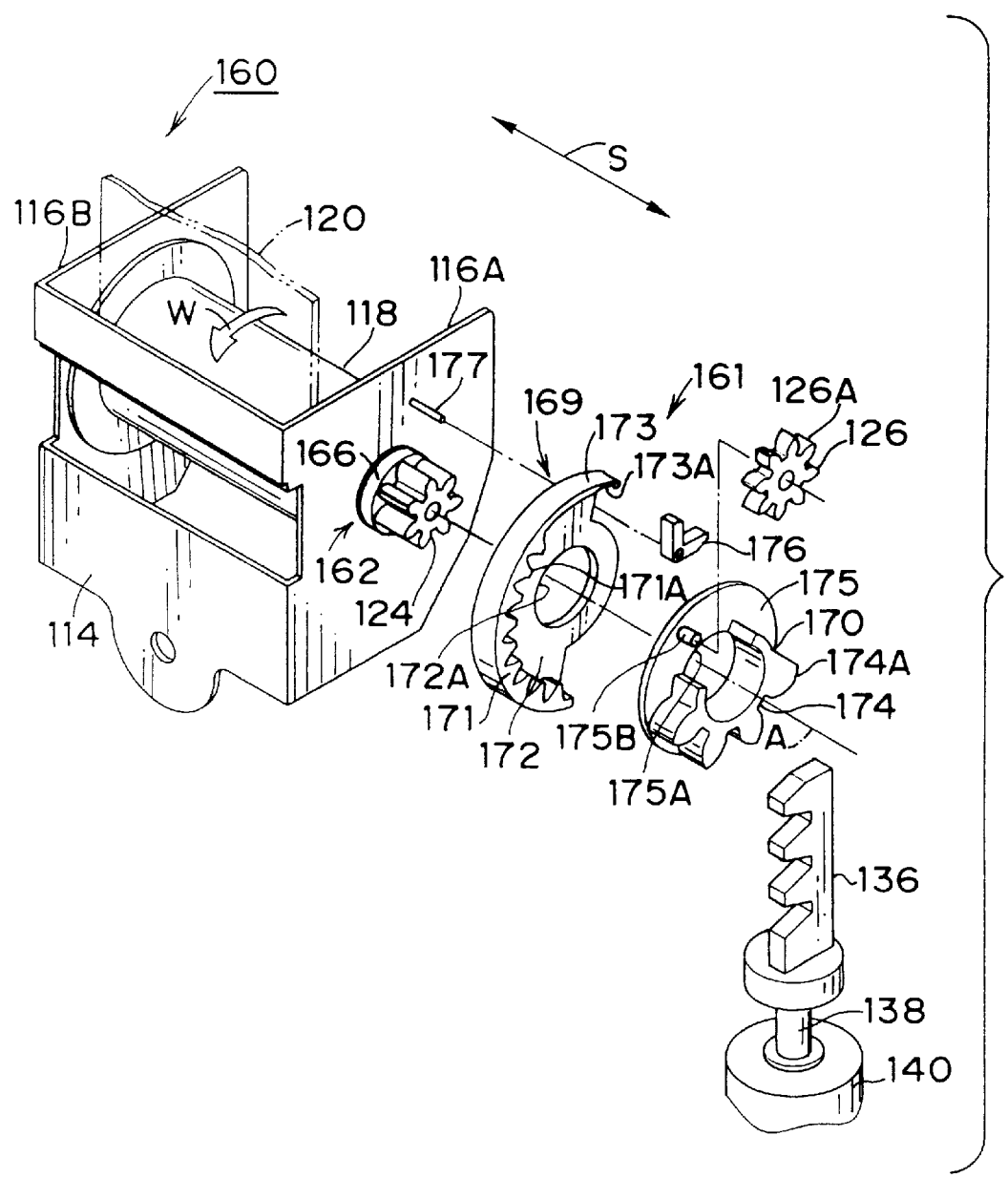
FIG. 16 is an exploded perspective view showing a structure of the webbing winding device according to a fourth embodiment of the present invention.

As shown in FIG. 16, the planetary gear mechanism 161 comprises a slider gear 169 and a ring gear 170. The sun gear 124 which meshes with the planet gear 126 is disposed coaxially with the spool 118 via the one-way clutch 162 as described above. Only when a torque is transmitted in the retracting direction W, is the sun gear 124 connected to the spool 118 and rotated integrally with the spool 118.

Figure 18:
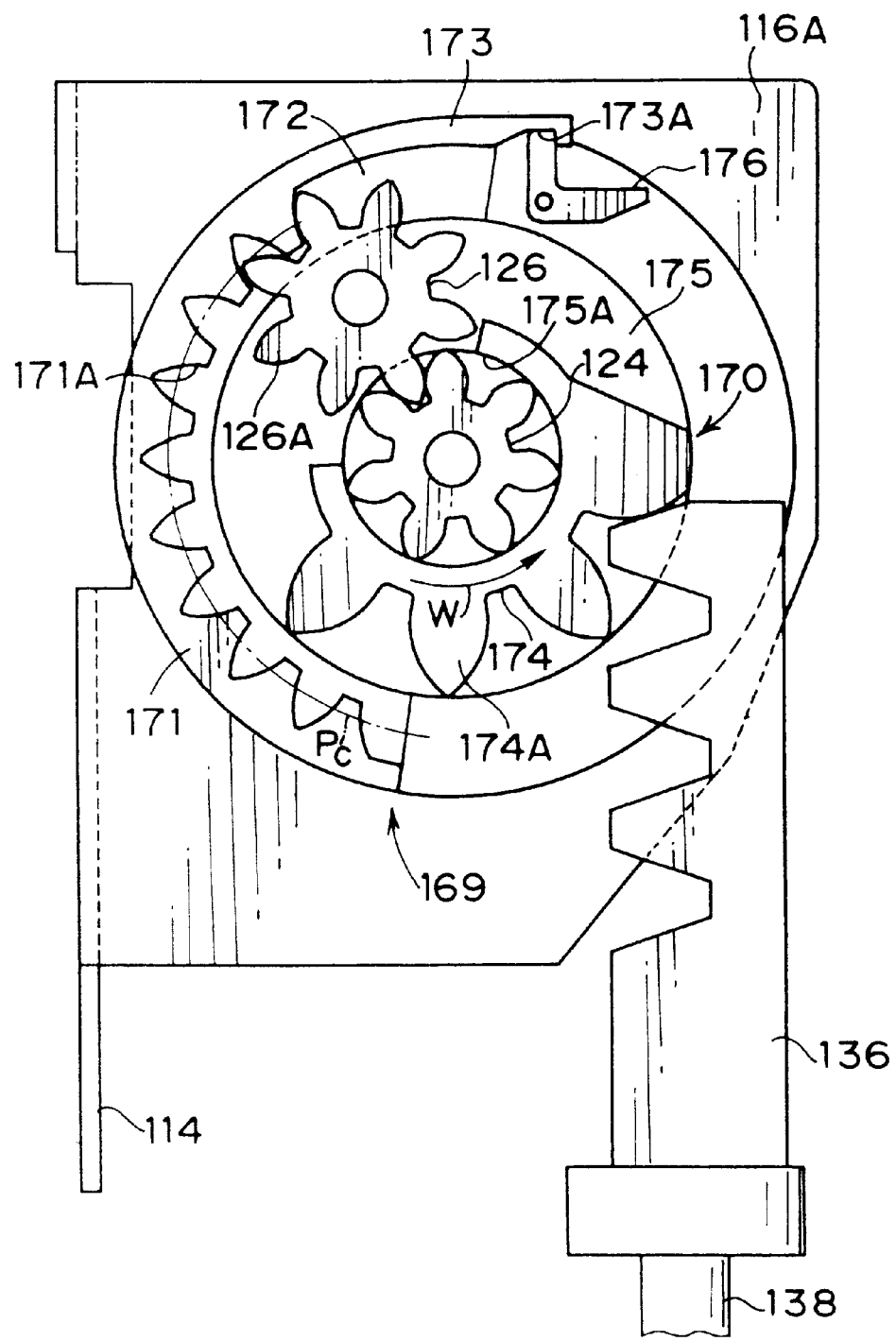
FIG. 18 is an axial plan view showing a lockup state in a rotation direction of the internal gear prior to an actuation of the pre-tensioner of the webbing winding device according to the fourth embodiment of the present invention.

The slider gear 169 is formed integrally from comprised of an internal tooth type internal gear 171 and a thin ring-like slider 172. The slider 172 is disposed at an end portion on the side of the spool 118 in the axial direction S. A circular opening 172A is formed around the axis A. The inside diameter of this circular opening is slightly larger than the outside diameter of the rotor 166. Teeth 171A are formed continuously on an inner peripheral face of the internal gear 171 along a pitch circle $P_C$ (see FIG. 18) corresponding to a traveling range of the rack 136 which moves linearly from its starting end position to the terminal end position when the piston driving apparatus is actuated. In the internal gear 171, as shown in FIG. 18, an engaging plate 173 extends from a bottom of a starting end tooth 171A. This engaging plate 173 is formed as a curved plate running along the dedendum circle of the teeth 171A. As shown in FIG. 18, an engaging groove 173A which is concave towards an outer peripheral face thereof is provided on an inner peripheral face of an end of the extending portion of this engaging plate 173.

In the slider gear 169, the slider 172 is placed on the side plate 116A with the circular opening 172A placed around the outer peripheral face of the rotor 166. As a result, the slider gear 169 is journaled by the rotor 166 so that it is rotatable around the axis A. On the other hand, a supporting shaft 177 is provided at an outer side face of the side plate 116A so as to protrude in the axial direction S. One end of this supporting shaft 177 corresponds to the engaging groove 173A in the engaging plate 173, as shown in FIG. 18, and the other end thereof supports stopper lever 176 supported on the pitch line $P_L$ of the rack 136. This stopper lever 176 is always urged by an urging member such as a twisted coil spring (not shown) in one direction (clockwise in FIG. 18). Before the piston driving unit is actuated, an end of this stopper lever 176 is inserted into the engaging groove 173A of the engaging plate 173 so as to restrict the slider gear 169 at a predetermined position in the rotation direction.

The ring gear 170 is comprised of a pinion 174 which is a semi-circular sector gear and a thin plate-like ring 175. This ring 175 is disposed on the side plate 116A. A circular opening 175A is formed around the axis in the ring 175. The inside diameter of this circular opening is equal to the inside diameter of the circular opening 172A in the slider gear 166. In the ring gear 170, the ring 175 is placed on the slider 172 with the circular opening 175A fitted around the outer peripheral face of the rotor 166 projecting through the slider 172. As a result, the ring gear 170 is journaled by the rotor 166 so that it is rotatable around the axis A. The sun gear 124 is located inside of the ring gear 170 in the radial direction.

A supporting shaft 175B is provided at a position opposite to the pinion 174 in the circumferential direction on an outer side face of the ring 175 so as to project in the axial directions. A hole made in the direction of the axis of the planet gear 126 is fitted around this supporting shaft 175B so that the planet gear 126 is supported rotatably. At the same time, the planet gear 126 meshes with the sun gear 124 inside the pinion 174. The initial position of the ring gear 70 is adjusted so that the starting end tooth 174A of the pinion 174 is in contact with the rack 136 connected to the piston 140 via the connecting rod 138 in the rotation direction and the teeth 126A of the planet gear 126 mesh with the starting end tooth 171A of the internal gear 171.

Note that a cover (not shown) for accommodating together with the side plate 116A the planetary gear mechanism 161 is attached to an outer side face of the side plate 116A. An inner side face of this cover is in contact with an outer side face of the pinion 174 so as to prevent the slider gear 169 and ring gear 170 from slipping off the rotor 166.

In the initial state before the piston driving apparatus shown in FIG. 18 is actuated, the starting end tooth 174A of the pinion 174 of the ring gear 170 is maintained so as to be in contact with the rack 136. If the rack 136 moves upward from the starting end position together with the movement of the piston 140, the ring gear 170 rotates counterclockwise.

Next, the action and operation of the webbing winding device of the present embodiment having the above structure will be described.

First, an action of the webbing winding device 160 of this embodiment when the pre-tensioner is actuated will be described. When the vehicle is ordinarily traveling normally, the planetary gear mechanism 161 is maintained in its initial state as shown in FIG. 18. That is, the rotation of the slider gear 169 is restricted by the stopper lever 176. The planet gear 126 meshes with the starting end tooth 171A of the internal gear 171 and the sun gear 124. In this initial state, the one-way clutch 162 is maintained in an OFF state so that the spool 118 can rotate in both directions.

If the vehicle decelerates in an emergency, the rack 136 is moved linearly from the starting end position to the terminal end position by the piston driving apparatus. As a result, the rack 136 rotates the ring gear 170 counterclockwise. At the same time, the one-way clutch 162 is place in an ON state, so that the sun gear 124 and spool 118 rotate integrally. When the ring gear 170 rotates counterclockwise, the planet gear 126 revolves around the axis A together with the rotation of the ring gear 170 and the sun gear 124 meshing with the planet gear 126 rotates counterclockwise. Thus, the spool 118 is rotated at high speed in the retracting direction along with the rotation of the sun gear 124. Consequently, the webbing 120 is retracted rapidly by the spool 118.

When the rack 136 is moved up to the terminal end position, as shown in FIG. 19, the front end of the rack 136 presses the other end of the stopper lever 176 and rotates it counterclockwise, thereby releasing the stopper lever 176 from the engaging plate 173 of the slider gear 169. As a result, the slider gear 169 may slide on the side plate 116A and rotate around the axis A. That is, the internal gear 171 of the slider gear 169 becomes able to move along the pitch circle $P_C$.

Figure 20:
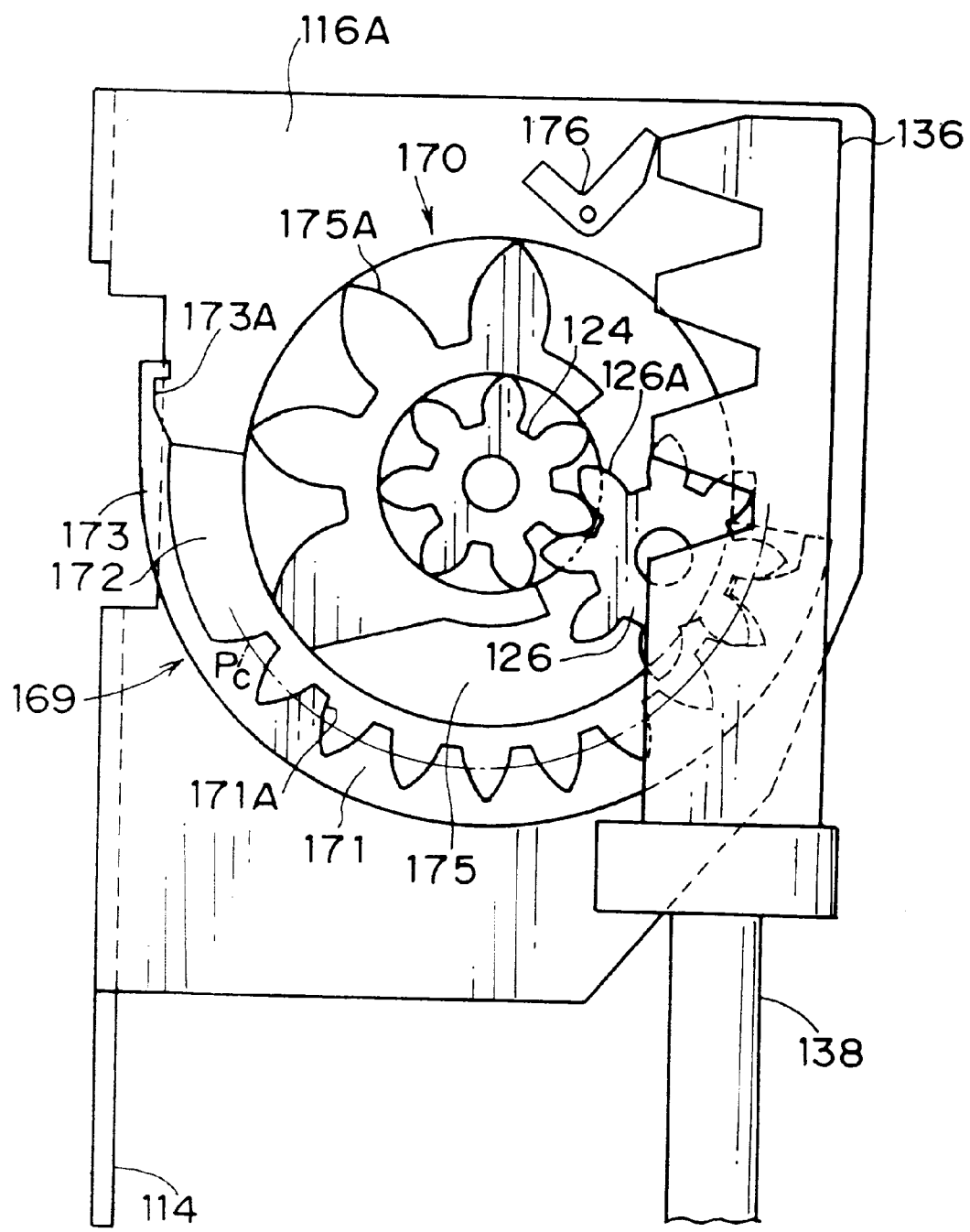
FIG. 20 is an axial plan view showing a state in which the internal gear is rotated by an inertial force from a spool after the actuation of the pre-tensioner of the webbing winding device according to the fourth embodiment of the present invention.

In the webbing winding device 160 according to this embodiment described above, if the piston driving apparatus is actuated, the rotation of the ring gear 170 is speeded up and transmitted to the sun gear 124. Thus, when the piston 140 is moved in the piston cylinder by receiving gas pressure when there is play in the webbing 120 fitted around a passenger, the spool 118 is rotated quickly in the retracting direction by the torque transmitted from the sun gear 124 to the spool 118 and the webbing 120 is wound around the spool 118. If the play in the webbing 120 is slight at this time, the pre-tensioner rotates the spool 118 in the retracting direction W until the play in the webbing 120 is removed. Accordingly, when a tension balancing the gas pressure in the piston cylinder is generated, then even if the piston has traveled partway to the terminal end on its traveling stroke, the piston 140 is halted. On the other hand, because the internal gear 171 becomes able to move along the pitch circle $P_C$ when the driving of the rack 136 by the piston driving apparatus is completed, the planet gear 126 meshing with the internal gear 171 becomes capable of being itself rotated counterclockwise by rotating the internal gear 171 counterclockwise along the pitch circle $P_C$ from the initial position, as shown in FIG. 20. As a result, when the driving of the rack 136 is completed, the sun gear 124 meshing with the planet gear 126 also becomes able to rotate together with the spool 118. Therefore, if there is play in the webbing 120 when the driving of the rack 136 by the piston driving apparatus is completed, the tension of the webbing 120 acting as a rotation load on the spool 118 is small and a large inertial force acts on the spool 118 rotating at a high speed. Thus, the internal gear 171 is rotated along the pitch circle $P_L$ by the torque transmitted from the sun gear 124 to the planet gear 126 so that the spool 118 may be rotated in the retracting direction W until the play in the webbing 120 is removed completely.

(Fifth Embodiment)

FIGS. 21–25 show a webbing winding device 180 according to the fifth embodiment of the present invention. The same reference numerals are attached to components having basically the same structure and function as in the third and fourth embodiments and a description thereof is omitted. The webbing winding device 180 of this embodiment comprises a well known planetary gear mechanism 181 and one-way clutch 162 as a torque transmission mechanism for transmitting torque to the spool 118.

In the webbing winding device 180, the sun gear 124 is connected to the spool 118 via the one-way clutch 162. This one-way clutch 162 is provided with an inner wheel portion, rollers and the like (not shown) accommodated in the rotor 166 provided integrally with the sun gear 124 shown in FIG. 21.

The one-way clutch 162 is mounted to a vehicle in the OFF state in which the spool 118 is separated from the sun gear 124. If the one-way clutch 162 is in the OFF state, even if the sun gear 124 is blocked from being able to rotate, the spool 118 can be rotated both in the retracting direction W and the feed-out direction R of the webbing 120. If torque is transmitted to the sun gear 124 in the retracting direction W and the rotor 166 rotates relatively in the retracting direction W with respect to the holding plate 165, the one-way clutch 162 taken out of the OFF state and placed in an ON state, so that the torque can be transmitted from the sun gear 124 to the spool 118.

Figure 21:
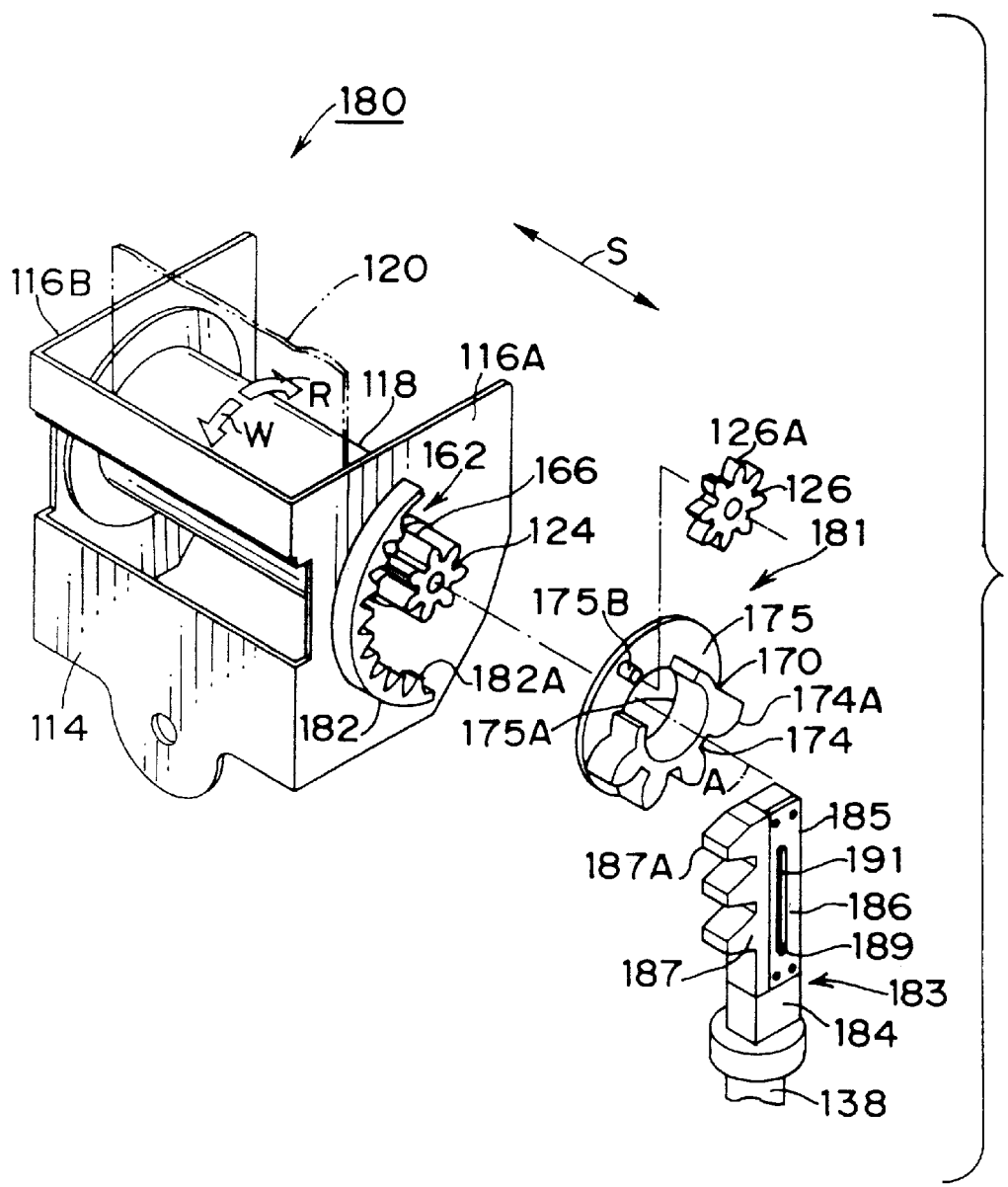
FIG. 21 is an exploded perspective view showing a 1structure of the webbing winding device according to a fifth embodiment of the present invention.

As shown in FIG. 21, the planetary gear mechanism 181 is provided with an internal gear 182. This internal gear 182 is fixed to an outer side face of the side plate 116A coaxially with the spool 118 and is formed in the form of a plate curved at a predetermined curvature around the axis A. Teeth (internal teeth) 182A having a shape which corresponds to the planet gear 126 are formed on an inner peripheral face of the internal gear 182.

Figure 22:
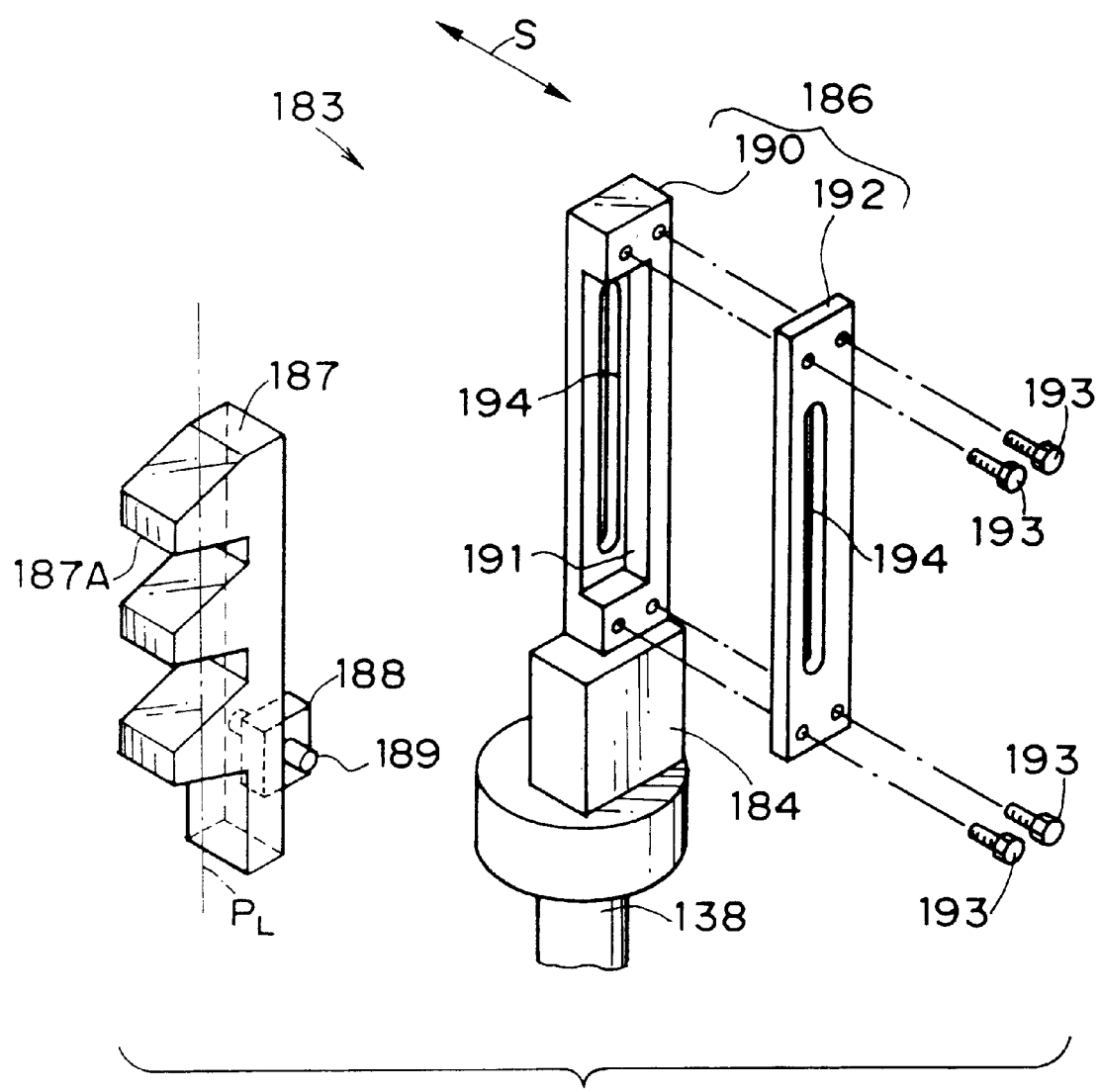
FIG. 22 is an exploded perspective view showing a structure of a rack in the webbing winding device according to the fifth embodiment of the present invention.
Figure 23:
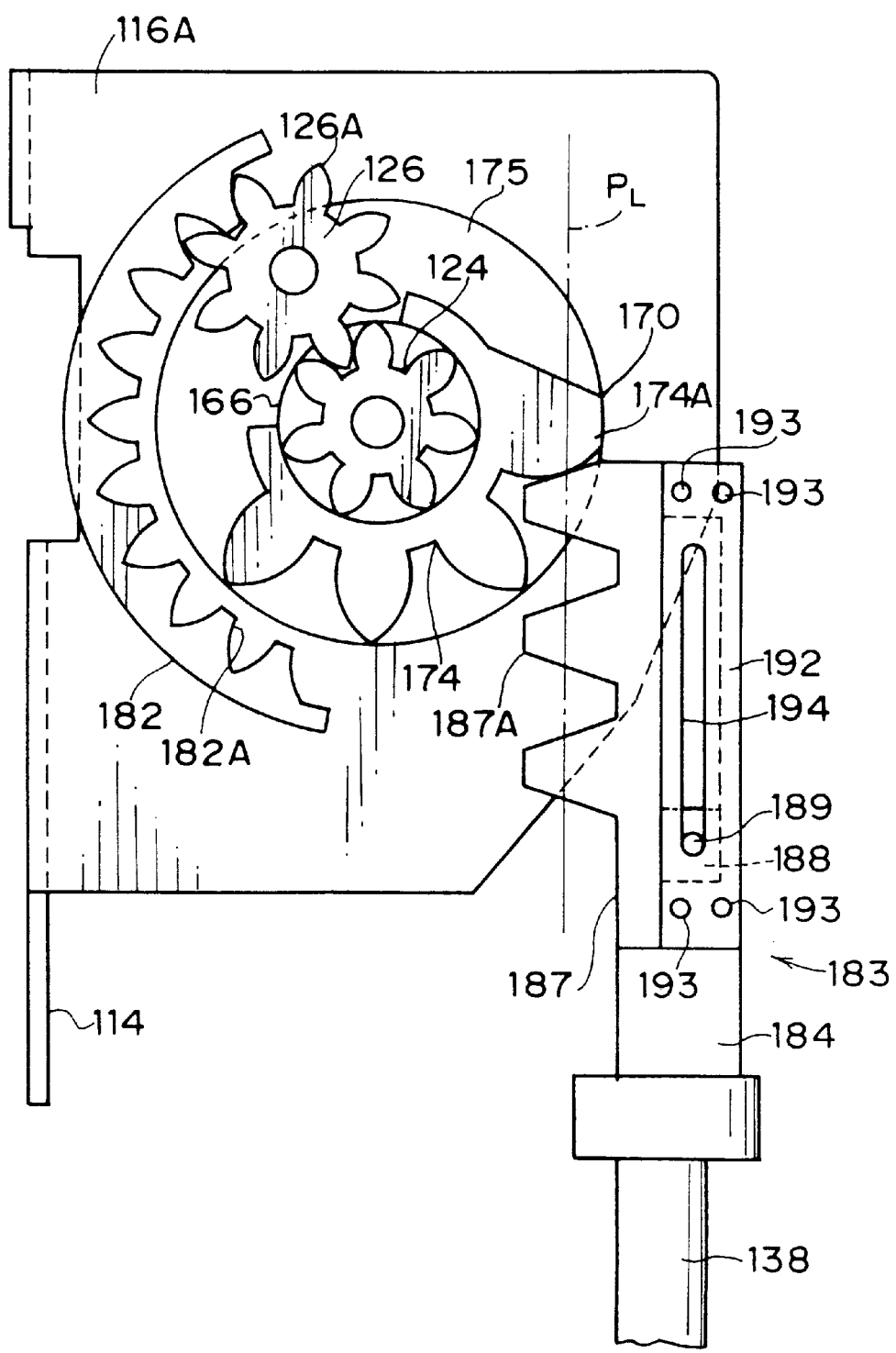
FIG. 23 is an axial plan view showing a state prior to an actuation of the pre-tensioner of the webbing winding device according to the fifth embodiment of the present invention.

A rack 183 to mesh with a pinion 174 of the planetary gear mechanism 181, as shown in FIG. 23, is supported by a piston 140 such that the longitudinal direction thereof is parallel to the pitch line $P_L$. As shown in FIG. 23, this rack 183 comprises a rod portion 184 disposed on the proximal end side in the length direction and a tooth portion 185 disposed on the distal end side. The tooth portion 185 comprises a supporting portion 186 and a slide portion 187 supported by this supporting portion 186, as shown in FIG. 22. The slide portion 187 is disposed on the side of the pinion 174 the supporting portion 186 closer to the pinion 174. In this slide portion 187, three teeth 187A are formed continuously on one side end face thereof in the transverse direction facing the pinion 174. A sliding piece 188 is provided on the other side face of the slide portion 187 such that it protrudes in the transverse direction from near the proximal end portion of the slide portion 187. Round bar-shaped guide pins 189 are provided on both side faces in the axial direction S of the sliding piece 188 so that they protrude in the axial directions.

On the other hand, the supporting portion 186 has a main body 190 formed integrally with the rod portion 184. A sliding groove 191 open to side end faces facing the slide portion 187 and the outer side face in the axial direction S, is formed in this main body 190 such that it extends in the longitudinal of the rack 186 as shown in FIG. 22. A side portion of the supporting portion 186 in the axial direction S is made of a plate-shaped lid plate 192. This lid plate 192 is fixed to the main body 190 with a plurality of (4) screws 193 so as to close the outer side face in the axial directions of the sliding groove 191. A guide slot 194 is formed in each of the outer side faces in the axial direction S of the sliding groove 191 and the lid plate 192 corresponding to each of a pair of guide pins 189 of the sliding piece 188. These guide slots extend in parallel to each other in the longitudinal direction of the rack 183.

When the rack 183 is assembled, the sliding piece 188 of the slide portion 187 is inserted into the sliding groove 191 of the main body 190 and, at the same time, one guide pin 189 of the sliding piece 188 is inserted into the guide slot 194 in the main body 190. After that, the other guide pin 189 is inserted into the guide slot 194 in the lid plate 192 and the lid plate 192 is fastened by the screws to the main body 190. Consequently, the slide portion 187 is able to slide in the longitudinal direction in the corresponding range of the guide slot.

Before the piston driving apparatus is actuated, the initial position of the ring gear 170 is adjusted in the rotation direction so that, as shown in FIG. 23, the teeth 126A of the planet gear 126 mesh with the starting end tooth 171A of the internal gear 171. On the other hand, the initial position of the rack 183 is adjusted so that the proximal end face of the slide portion 187 is in contact with the distal end face of the rod portion 184 and so that the guide pins 189 are located near the rear end 194A of the guide slots 194. Moreover, the rack 183 is supported by the piston 140 so that the starting end tooth 187A of the slide portion 187 comes into contact with the starting end tooth 174A of the pinion 174.

Next, the action and operation of the webbing winding device 180 of the present embodiment having the above structure will be described.

First, the action of the webbing winding device 180 of the present embodiment when the pre-tensioner is actuated will be described. When the vehicle is traveling normally, as shown in FIG. 23, the planetary gear mechanism 181 is maintained in its initial state. That is, the planet gear 126 meshes with the starting end tooth 171A of the internal gear 171 and the sun gear 124 and the rack 183 is in contact with the starting end tooth 174A of the pinion 174. In this initial state, the one-way clutch 162 is maintained in the OFF state so that the spool 118 can rotate in both directions.

If the vehicle performs an emergency deceleration, the rack 183 is moved linearly from the starting end position to the terminal end position by the piston driving apparatus. As a result, the tooth 187A of the slide portion 187 of the rack 183 presses the tooth 174A of the pinion 174 along the pitch line $P_L$. This pressing force is converted into a rotation force by the pinion 174 so as to rotate the ring gear 170 counterclockwise. In this condition, the slide portion 187 is confined to a linear motion along the sliding groove 191 by the tooth 174A of the pinion 174 and the distal end face of the rod portion 184. At the same time as the ring gear 170 is rotating counterclockwise, the one-way clutch 162 is placed in an ON state and the sun gear 124 and spool 118 rotate integrally. When the ring gear 170 rotates counterclockwise, the planet gear 126 revolves around with the rotation of the ring gear 170, and the sun gear 124 meshing with the planet gear 126 rotates counterclockwise. Thus, with the rotation of the sun gear 124, the spool 118 is rotated at a high speed in the retracting direction W. As a result, the webbing 120 is retracted rapidly by the spool 118.

Figure 24:
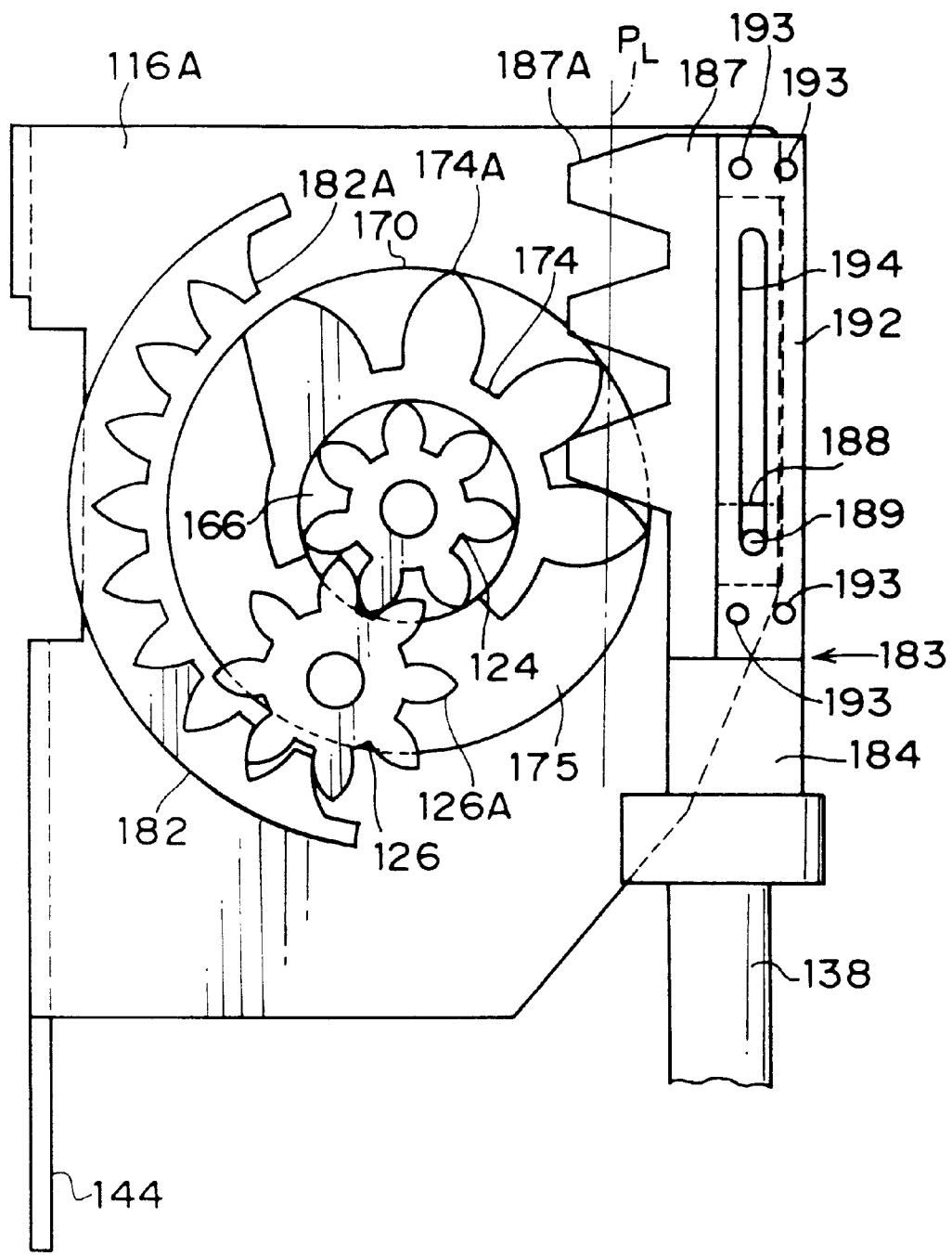
FIG. 24 is an axial plan view showing a state after an actuation of the pre-tensioner of the webbing winding device according to the fifth embodiment of the present invention.
Figure 25:
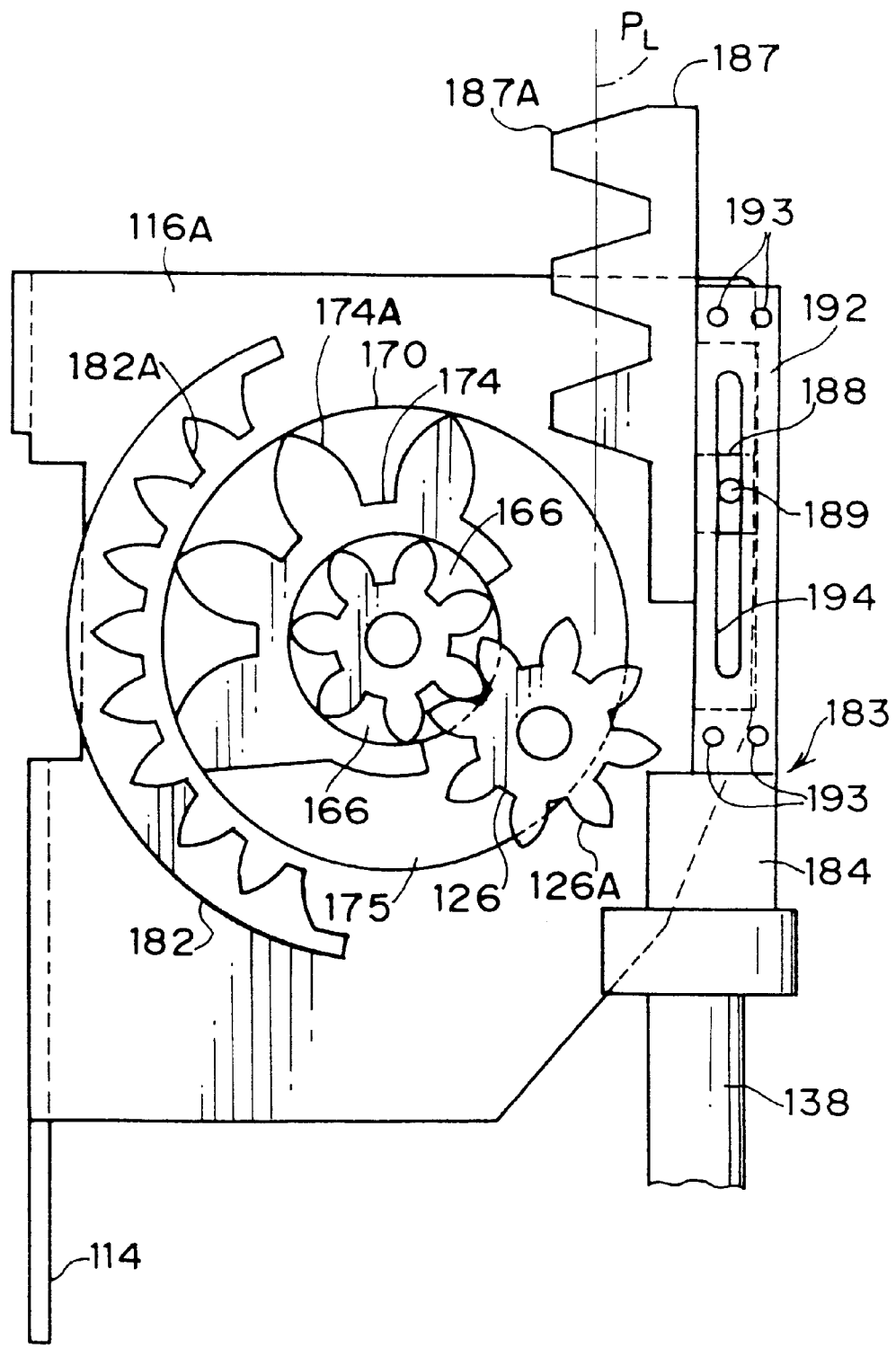
FIG. 25 is an axial plan view showing a state in which a tooth portion of the rack is advanced by an inertial force from the spool after the actuation of the pre-tensioner of the webbing winding device according to the fifth embodiment of the present invention.

When the rack 183 is moved up to the terminal end position as shown in FIG. 24, the slide portion 187 of the rack 183 is able to move linearly along the sliding groove 191 with the rotation of the pinion 174 in the counterclockwise direction.

In the webbing winding device 180 according to this embodiment described above, if the piston driving apparatus is actuated, the rotation of the ring gear 170 is speeded up and transmitted to the sun gear 124. Thus, when the piston 140 is moved in the piston cylinder by receiving gas pressure when there is play in the webbing 120 fitted around by a passenger, the spool 118 is rotated at high speed in the retracting direction W by torque transmitted from the sun gear 124 to the spool 118, and the webbing 120 is wound around the spool 118. If the play in the webbing 120 is slight at this time, the pre-tensioner rotates the spool 118 in the retracting direction W until the play in the webbing 120 is removed. When a tension balancing the gas pressure in the piston cylinder is generated, then, even if the piston has traveled partway to the terminal end on its traveling stroke, the piston 140 is halted.

On the other hand, when the driving of the rack 183 by the piston driving apparatus is completed, the slide portion 187 of the rack 183 becomes capable of moving forward along of the pitch line $P_L$ along the sliding groove 191. By advancing the slide portion 187 of the rack 183 up to a position where it does not interfere (contact) with the tooth 174A of the pinion 174, the pinion 174 which had been meshed with the rack 183 becomes able to rotate counterclockwise. Further, if the ring gear 170 rotates up to a position where the planet gear 126 is released from the internal gear 182, the planet gear 126 and the sun gear 124 become able to rotate with the spool 118 without the rotation of the pinion 174.

Therefore, if there is play in the webbing 120 when the driving of the rack 183 is completed, the tension of the webbing 120 acting as a rotation load on the spool 118 is small and a large inertial force acts on the spool 118 rotating at a high speed. Thus, the inertial force (torque) from the spool 118 is transmitted to the slide portion 187 of the rack 183 via the sun gear 124, planet gear 126 and internal gear 182. As a result, the slide portion 187 is advanced so that the spool 118 can be rotated in the retracting direction W until the play in the webbing 120 is removed completely.

(Modification 1 of the Fifth Embodiment)

Modification 1 of the rack according to the fifth embodiment of the present invention will be described with reference to FIGS. 26 and 27. Note that the rack 195 shown in FIG. 26 may be applied to the webbing winding device 180 shown in FIGS. 21 to 25 instead of the rack 183.

As shown in FIG. 27, the rack 195 is supported by the piston 140 such that a longitudinal direction thereof is parallel to the pitch line $P_L$. This rack 195 is comprised of a rod portion 196 disposed on a proximal end side thereof in the longitudinal direction and a tooth portion 197 disposed on the distal end side thereof. In the tooth portion 197, as shown in FIG. 26, three teeth 198, 199 and 200 are formed continuously along the pitch line $P_L$ on one side end face in the transverse direction facing the pinion 174.

The starting end tooth 198 of the tooth portion 197 has a tooth width corresponding to the pinion 174 and the tooth width thereof is larger than the tooth width of the teeth 199 and 200. The tooth width of the other teeth 199 and 200 are substantially ½ the tooth width of the starting end tooth 198. The tooth 199 disposed in the center in the longitudinal direction is disposed towards the inside in the axial direction S (towards the spool 118). The tooth 200 at the terminal end is disposed further towards the outside in the axial direction the central tooth 199.

The teeth 198 and 199 in the tooth portion 197 and the rod portion 196 are formed integrally. The tooth 200 at the terminal end is a single part which is attached to a predetermined position of the tooth portion 197. The tooth 200 is integrally provided with a sliding piece 201, which protrudes in the transverse direction from the bottom of the tooth 200 (a section at right angle in the short side direction of this sliding piece 201 is of the same shape as the tooth bottom of the tooth 200). Round bar-shaped guide pins 202 are provided on both sides in the axial direction S of the sliding piece 201 so as to protrude in the axial direction S. Further, a cylindrical supporting protrusion 203 protrudes in the longitudinal direction from the distal end face of the sliding piece 201.

Figure 26:
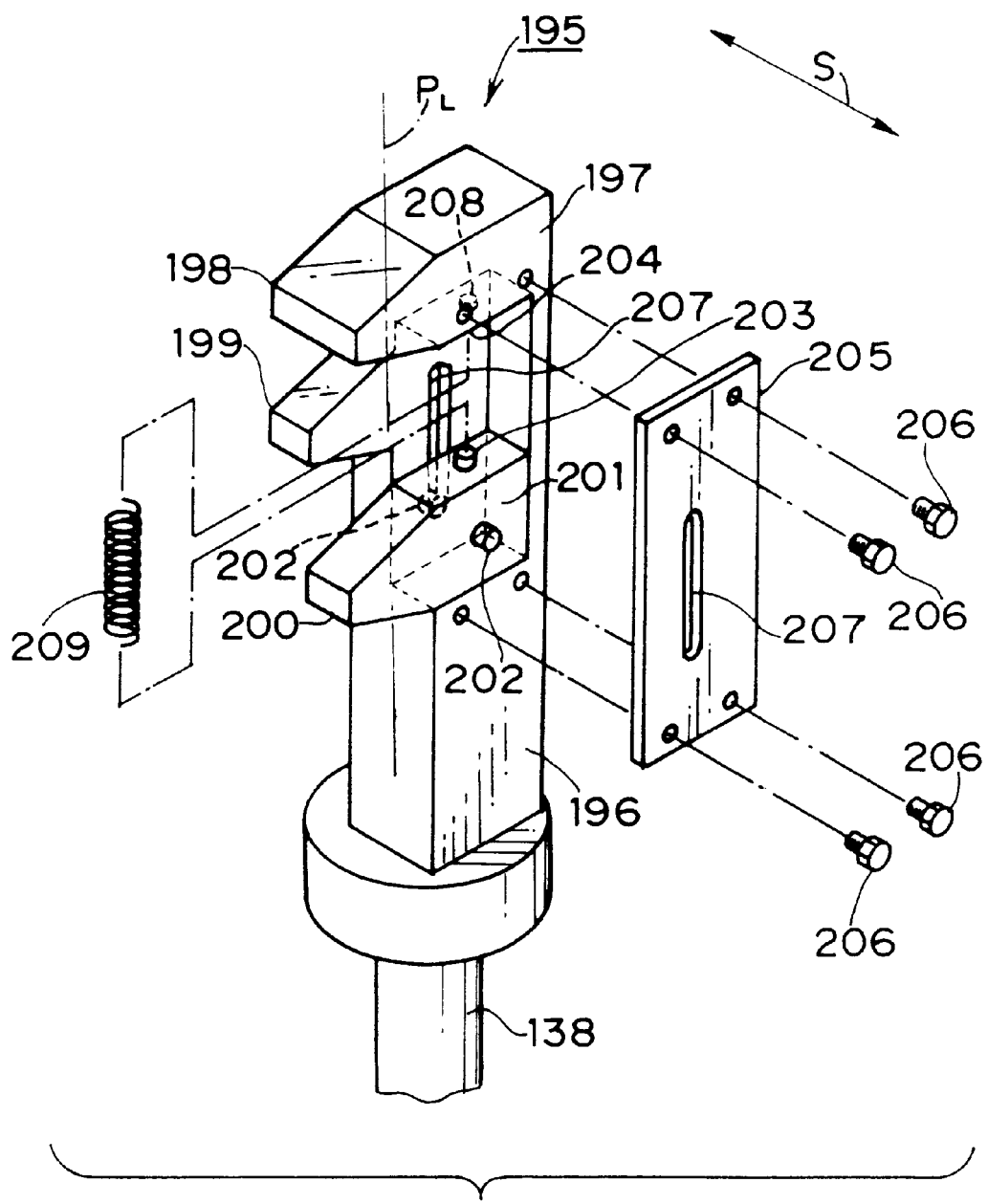
FIG. 26 is an exploded perspective view showing a structure of a modification 1 of the rack in the webbing winding device according to the fifth embodiment of the present invention.

On the other hand, in the tooth portion 197, as shown in FIG. 26, a sliding groove 204 open to the side face facing the pinion 174 and the outer side face in the axial direction S is formed extending in the longitudinal direction of the rack 186. This sliding groove 204 is disposed further to the outside in the axial directions than the central tooth. The width of the sliding groove 204 in the axial direction S is slightly larger than the width of the sliding piece 201. This sliding groove 204 extends in the longitudinal direction over a range from the distal end of the tooth bottom of the central tooth 199 to a rear end of the tooth bottom of the tooth 200 at the terminal end. A lid plate 205 is fixed to an outer side face in the axial directions of the tooth portion 197 by a plurality (4) of screws 206. This lid plate 205 closes the outer side face in the axial direction S of the sliding groove 204.

Each of the inner side face in the axial direction S of the sliding groove 204 and the lid plate 205 has a guide slot 207 corresponding to each of the pair of guide pins 202 of the sliding piece 201. These guide slots 207 extend in parallel to each other in the longitudinal direction of the rack 195. A cylindrical supporting protrusion 208 is provided on the distal end face of the sliding groove 204 corresponding to the supporting protrusion 203 of the sliding piece 201. Once the sliding piece 201 has been inserted into the sliding groove 204, one end of a coil spring 209 is fitted over the supporting protrusion 203 while the other end of the coil spring 209 is fitted over the protrusion 208. The supporting protrusions 203 and 208 support the coil spring 209 in a compressed state between the sliding piece 201 and the distal end face of the sliding groove 204.

When the rack 195 is assembled, first the sliding piece 201 of the tooth 200 at the terminal end is inserted into the sliding groove 204 of the tooth portion 197. Then, one guide pin 202 of the sliding piece 201 is inserted into the guide slot 207 of the sliding groove 204. At the same time, the ends of the coil spring 209 are fitted over the supporting protrusions 203 and 208. After that, while the other guide pin 202 is being inserted into the guide slot 207 of the lid plate 205, the lid plate 205 is screwed tightly to the side face of the tooth portion 197. As a result, the tooth 200 at the terminal end is able to move from a position one pitch to the rear of the central tooth 199, indicated by solid line of FIG. 27, to a position which substantially coincides with the central tooth 199. Here, the tooth 200 is maintained at the position one pitch to the rear of the central tooth 199 by an urging force of the coil spring 209 before the piston driving apparatus is actuated.

The action and operation of the webbing winding device according to the fifth embodiment, to which the rack 195 of the modification 1 having the above structure is applied, will now be described.

The operation when the piston driving apparatus is operated to move the rack 195 from the starting end position to the terminal end position is basically the same as in the webbing winding device 180 to which the rack 183 shown in FIGS. 21–25 is applied and therefore, a description thereof is omitted. In the webbing winding device to which the rack 195 according the modification 1 of the present invention is applied, when the driving of the rack 195 by the piston driving apparatus 35 is completed, the tooth 200 at the terminal end of the rack 195 is able to advance along the pitch line $P_L$. Therefore, in the pinion 174, which had been meshed with the rack 195, the tooth 200 of the rack 195, as indicated by the two dot dash line of FIG. 27, is advanced up to a position where it does not interfere with (contact) the tooth 174A of the pinion 174 so that the pinion 174 is able to rotate counterclockwise. Therefore, if there is play in the webbing 120 when the driving of the rack 183 is completed, the tension of the webbing 120 acting as a rotation load on the spool 118 is small and a large inertial force acts on the spool 118 rotating at a high speed. Thus, the inertial force (torque) from the spool 118 is transmitted to the tooth 200 of the rack 195 via the sun gear 124, planet gear 126 and internal gear 182. The tooth 200 is advanced while resisting an urging force of the coil spring 209 so that the spool 118 may be rotated in the retracting direction W until the play in the webbing 120 is removed completely.

According to the webbing winding device of the present invention described above, even if the play in the webbing is large, the webbing is able to be retracted reliably until it becomes tense when the pre-tensioner is actuated. Further, because the driving rotation amount of the pinion by the driving gear is increased there is no need to increase the traveling stroke of the driving gear or to and add a speed up gear, and therefore enlargement of the device can be suppressed.

What is claimed is:

1. A webbing winding device having a pre-tensioner for tensioning a webbing for restraining a passenger in a passenger restraining direction in an emergency deceleration of a vehicle, said webbing winding device comprising:
   a winding shaft to which an end of said webbing is fixed; and
   a gear train mechanism comprising a plurality of gears arranged in such a manner that adjacent gears mesh with each other, wherein an external driving gear of said gear train receiving a driving force when said pre-tensioner is actuated is driven from a preliminarily set starting end position to a terminal end position so as to rotate said winding shaft in a direction for retracting the webbing and when the driving of said driven gear is completed, at least a pair of adjacent, engaged gears of said gear train are moved relative to each other in a radial direction relative to said winding shaft to a disengaging position so as to enable said winding shaft to continue to be rotated in the direction for retracting the webbing by inertial force.

2. A webbing winding device according to claim 1, wherein said gear train mechanism is provided at a portion at least corresponding to said terminal end position of a gear and along a pitch line, and has a toothless portion forming a gap between said driving gear and another adjacent gear when driving of said driving gear is completed.

3. A webbing winding device according to claim 1, wherein said gear train mechanism comprises a tooth portion; a rod portion, a driving portion movably supporting the rod portion; and a rotating portion.

4. A webbing winding device according to claim 1, wherein said gear train mechanism comprises; a tooth portion formed in at least two portions; a rod portion, a driving portion for movably supporting the rod portion; and a rotating portion.

5. A webbing winding device according to claim 3, wherein said driving portion comprises; a gas generator; a piston portion to which an end of a rod portion of said gear train mechanism is fixed; and a cylinder portion for slidably supporting said piston portion.

6. A webbing winding device having a pre-tensioner for tensioning a webbing for restraining a passenger in a passenger restraining direction in an emergency deceleration of a vehicle, said webbing winding device comprising:
   a winding shaft to which an end of said webbing is fixed; and
   a gear train mechanism comprising a plurality of gears arranged in such a manner that adjacent gears mesh with each other, wherein a driving gear of said gear train, which receives an external driving force when said pre-tensioner is actuated, is driven from a starting position to a terminating end position which are set in advance so as to rotate said winding shaft in a direction for winding the webbing; and
   an engagement release device which, when the driving of said driving gear is completed, moves at least one gear of said gear train mechanism radially relative to the winding shaft to a position away from another adjacent gear of said gear train so as to enable said winding shaft to continue to be rotated in said webbing retracting direction by inertial force.

7. A webbing winding device according to claim 6, wherein said gear train mechanism comprises a pinion and a rack formed as said driving gear which meshes with said pinion, wherein said engagement releasing device has a guide member for changing a direction of movement of said rack moving along the pitch line with respect to said pinion at an intermediate position between said starting end position and terminating end position so as to release said rack from said pinion near said terminating end position.

8. A webbing winding device according to claim 6, wherein said gear train mechanism comprises a pinion and a rack formed as said driving gear which meshes with said pinion and whose a rear end tooth portion which corresponds to said terminating end position is separable from other remaining portions, and said engagement releasing device has a release guide member for changing a direction of movement of said rear end tooth portion moving along the pitch line with respect to said pinion at an intermediate position between said starting end position and terminating end position so as to release said rear end tooth portion from said pinion near said terminating end position.

9. A webbing winding device according to claim 6, wherein said engagement release device comprises a gear supporting body supporting at least one gear in said gear train mechanism movably along an axis; and a release driving member for moving a gear supported by said gear supporting body along said axis when the driving of said driving gear is completed so as to release the gear from other adjacent gears.

10. A webbing winding device according to claim 9, wherein said release driving member comprises a cam apparatus and a protruding portion, and distances from an axis of said winding shaft to said cam apparatus and said protruding portion are substantially the same.

11. A webbing winding device having a pre-tensioner for tensioning a webbing for restraining a passenger in a passenger restraining direction in an emergency deceleration of a vehicle, said webbing winding device comprising:
   a winding shaft to which an end of said webbing is fixed; and
   a gear train mechanism comprising a plurality of gears including an internal gear, a sun gear and a planet gear which meshes with these gears, wherein a driving gear which receives an external driving force when said pre-tensioner is actuated, is driven from starting end position to a terminating end position, which are set in advance, so as to rotate the winding shaft in a direction for retracting the webbing, and when the driving of said driving gear is completed, said internal gear is supported movably along a pitch line of said internal gear so that said planet gear is capable of rotating in a direction corresponding to said webbing retracting direction.

12. A webbing winding device according to claim 11 further comprising a driving apparatus for supporting a portion of said gear train mechanism so that it is able to be driven.

13. A webbing winding device according to claim 11, wherein said winding shaft comprises a pair of supporting members for rotatably supporting said winding shaft.

14. A webbing winding device according to claim 12, wherein said driving portion comprises a gas generator, a piston portion to which an end of a rod portion of said gear train mechanism is fixed, and a cylinder portion for slidably supporting said piston portion.

15. A webbing winding device according to claim 13, further comprising a one-way clutch disposed on one of said supporting members and having an outer wheel portion provided integrally with said gear train mechanism.

16. A webbing winding device having a pre-tensioner for tensioning a webbing for restraining a passenger in a passenger restraining direction in an emergency deceleration of a vehicle, said webbing winding device comprising:
   a winding shaft to which an end of said webbing is fixed; and
   a gear train mechanism comprising a plurality of gears including a pinion and a rack which meshes with said pinion, wherein said rack, which receives an external driving force when said pre-tensioner is actuated, is driven from a starting end position to a terminating end position, which are set in advance, so as to rotate said winding shaft in a webbing winding direction and a part or all of said rack is supported to be radially movable relative to said winding shaft along the pitch line of said rack so that said pinion is able to continue to be rotated in a direction corresponding to said webbing retracting direction when the driving of said rack is completed.

17. A webbing winding device according to claim 16, wherein said winding shaft comprises a pair of supporting members for rotatably supporting said winding shaft.

18. A webbing winding device according to claim 17, further comprising a one-way clutch disposed on one of said supporting members and having an outer wheel portion provided integrally with said gear train mechanism.

19. A webbing winding device according to claim 17, further comprising a torque transmitting mechanism for transmitting torque to said winding shaft.

20. A webbing winding device according to claim 19, wherein said torque transmitting mechanism comprises a planetary gear mechanism; and a clutch disposed at said supporting member and having an outer wheel portion provided integrally with said gear train mechanism.

21. A webbing winding device having a pre-tensioner for tensioning a webbing for restraining a passenger in a passenger restraining direction in an emergency deceleration of a vehicle, said webbing winding device comprising:

a winding shaft to which an end of said webbing is fixed; and a gear train mechanism comprising a plurality of gears arranged in such a manner that adjacent gears mesh with each other, wherein an external driving gear of said gear train receiving a driving force when said pre-tensioner is actuated is driven from a preliminarily set starting end position to a terminal end position so as to rotate said winding shaft in a direction for retracting the webbing and when the driving of said driven gear is completed, at least a pair of adjacent, engaged gears of said gear train are moved relative to each other in an axial direction relative to said winding shaft to a disengaging position so as to enable said winding shaft to continue to be rotated in the direction for retracting the webbing by inertial force.

22. A webbing winding device having a pre-tensioner for tensioning a webbing for restraining a passenger in a passenger restraining direction in an emergency deceleration of a vehicle, said webbing winding device comprising:

a winding shaft to which an end of said webbing is fixed; and a gear train mechanism comprising a plurality of gears arranged in such a manner that adjacent gears mesh with each other, wherein an external driving gear of said gear train receiving a driving force when said pre-tensioner is actuated is driven from a preliminarily set starting end position to a terminal end position so as to rotate said winding shaft in a direction for retracting the webbing and when the driving of said driven gear is completed, at least a pair of adjacent, engaged gears of said gear train are moved relative to one another orthogonally of the pitch line of the engaged gears to a disengaging position so as to enable said winding shaft to continue to be rotated in the direction for retracting the webbing by inertial force.

\* \* \* \* \*